United States Patent
Blair-Goldensohn et al.

(10) Patent No.: US 8,010,539 B2
(45) Date of Patent: Aug. 30, 2011

(54) PHRASE BASED SNIPPET GENERATION

(75) Inventors: Sasha Blair-Goldensohn, New York, NY (US); Kerry Hannan, Sunnyside, NY (US); Ryan McDonald, New York, NY (US); Tyler Neylon, Mountain View, CA (US); Jeffrey C. Reynar, New York, NY (US)

(73) Assignee: Google Inc., Mountain View, CA (US)

( * ) Notice: Subject to any disclaimer, the term of this patent is extended or adjusted under 35 U.S.C. 154(b) by 365 days.

(21) Appl. No.: 12/020,483

(22) Filed: Jan. 25, 2008

(65) Prior Publication Data
US 2009/0193011 A1   Jul. 30, 2009

(51) Int. Cl.
*G06F 17/30* (2006.01)
(52) U.S. Cl. .......... 707/750; 707/999.003; 707/999.005; 704/9; 715/231
(58) Field of Classification Search .................. 707/736, 707/741, 750, 999.003, 999.005; 704/9; 715/231; 705/10
See application file for complete search history.

(56) References Cited

U.S. PATENT DOCUMENTS

| | | | |
|---|---|---|---|
| 6,892,179 B1 * | 5/2005 | Zacharia ..................... | 705/10 |
| 7,315,848 B2 | 1/2008 | Pearse et al. | |
| 7,523,085 B2 * | 4/2009 | Nigam et al. ................ | 706/55 |
| 7,558,769 B2 * | 7/2009 | Scott et al. .................. | 706/45 |
| 7,624,093 B2 | 11/2009 | Fortuna | |
| 7,685,091 B2 | 3/2010 | Boone et al. | |
| 7,720,835 B2 | 5/2010 | Ward et al. | |
| 2006/0069589 A1 | 3/2006 | Nigam et al. | |
| 2006/0242040 A1 | 10/2006 | Rader | |
| 2007/0016580 A1 | 1/2007 | Mann et al. | |
| 2007/0027672 A1 | 2/2007 | Decary et al. | |
| 2007/0078671 A1 | 4/2007 | Dave et al. | |
| 2007/0078833 A1 | 4/2007 | Chea et al. | |
| 2007/0143176 A1 | 6/2007 | Nong et al. | |
| 2007/0165904 A1 | 7/2007 | Nudd et al. | |
| 2007/0174343 A1 | 7/2007 | Fortuna | |
| 2007/0226204 A1 | 9/2007 | Feldman | |
| 2007/0266025 A1 | 11/2007 | Wagner et al. | |
| 2008/0005051 A1 | 1/2008 | Turner et al. | |
| 2008/0133488 A1 | 6/2008 | Bandaru et al. | |
| 2008/0154883 A1 | 6/2008 | Chowdhury et al. | |
| 2008/0215571 A1 | 9/2008 | Huang et al. | |
| 2008/0249764 A1 | 10/2008 | Huang et al. | |
| 2008/0288481 A1 | 11/2008 | Zeng et al. | |
| 2009/0048823 A1 | 2/2009 | Liu et al. | |
| 2009/0112892 A1 | 4/2009 | Cardie et al. | |
| 2009/0193328 A1 * | 7/2009 | Reis et al. ..................... | 715/231 |
| 2009/0248399 A1 * | 10/2009 | Au ..................................... | 704/9 |
| 2009/0319342 A1 * | 12/2009 | Shilman et al. ................. | 705/10 |
| 2009/0319518 A1 * | 12/2009 | Koudas et al. .................... | 707/5 |

OTHER PUBLICATIONS

Generic high-Throughput methods for multilingual sentiment detection, Gindl et al., 2010.*

(Continued)

*Primary Examiner* — Jean M Corrielus
(74) *Attorney, Agent, or Firm* — Fenwick & West LLP

(57) ABSTRACT

Disclosed herein is a method, a system and a computer product for generating a snippet for an entity, wherein each snippet comprises a plurality of sentiments about the entity. One or more textual reviews associated with the entity is selected. A plurality of sentiment phrases are identified based on the one or more textual reviews, wherein each sentiment phrase comprises a sentiment about the entity. One or more sentiment phrases from the plurality of sentiment phrases are selected to generate a snippet.

26 Claims, 12 Drawing Sheets

OTHER PUBLICATIONS

Automatic analysis of document sentiment, 2006.*
Sentiment analysis of blogs by combining lexical knowledge, 2009.*
Capturing Favorability Using Natural Language Processing, Tetsuya Nasukawa, Jeonghee Yi, 2003.*
A Sentimental Education: Sentiment Analysis Using Subjectivity Summarization Based on Minimum Cuts, Bo Pang and Lillian Lee, 2004.*
Philip Beineke et al., *An Exploration of sentiment summarization*, Proceedings of the AAAI Spring Symposium on Exploring Attitude and Affect in Text: Theories and Applications, 2004, 3 pages.
Giuseppe Carenini et al., *Multi-Document Summarization of Evaluative Text*, 11th Conference of the European Chapter of the Association for Computational Linguistics, Apr. 3-7, 2006, pp. 305-312.
Giuseppe Carenini et al., *Extracting Knowledge from Evaluative Text*, Proceedings of the Third International Conference on Knowledge Capture, Oct. 2-5, 2005, pp. 11-18, ACM Press.
Yejin Choi et al., *Identifying Sources of Opinions with Conditional Random Fields and Extraction Patterns*, Human Language Technology Conference and Conference on Empirical Methods in Natural Language Processing, Oct. 6-8, 2005, pp. 355-362.
John Blitzer et al., *Biographies, Bollywood, Boom-boxes and Blenders: Domain Adaptation for Sentiment Classification*, Proceedings of the 45th Annual Meeting of the Association for Computational Linguistics, Jun. 23-30, 2007, pp. 440-447.
Michael Gamon et al., *Pulse: Mining Customer Opinions from Free Text*, Advances in Intelligent Data Analysis VI, 6th International Symposium on Intelligent Data Analysis, IDA 2005, Sep. 8-10, 2005, pp. 121-132.
Minqing Hu et al., *Mining and Summarizing Customer Reviews*, Proceedings of the Tenth ACM SIGKDD International Conference on Knowledge Discovery and Data Mining, Aug. 22-25, 2004, pp. 168-177.
Minqing Hu et al., *Mining Opinion Features in Customer Reviews*, Proceedings of the Nineteenth National Conference on Artificial Intelligence (AAAI-04), 2004, pp. 755-760.
Yi Mao et al., *Isotonic Conditional Random Fields and Local Sentiment Flow*, Proceedings of the 20th Annual Conference on Neural Information Processing Systems, Dec. 4-7, 2006, pp. 961-968.
Ryan McDonald et al., *Structured Models for Fine-to-Coarse Sentiment Analysis*, Proceedings of the 45th Annual Meeting of the Association for Computational Linguistics, Jun. 23-30, 2007, pp. 432-439.
George A. Miller, *WordNet: A Lexical Database for English*, Communications of the ACM, Nov. 1995, pp. 39-41, vol. 38, No. 11.
Bo Pang et al., *Thumbs up? Sentiment Classification using Machine Learning Techniques*, Proceedings of the 2002 Conference on Empirical Methods in Natural Language Processing, Jul. 6-7, 2002, pp. 79-86.
Ana-Maria Popescu et al., *OPINE: Extracting Product Features and Opinions from Reviews*, Human Language Technology Conference and Conference on Empirical Methods in Natural Language Processing, Oct. 6-8, 2005, pp. 32-33.
Benjamin Snyder et al., *Multiple Aspect Ranking using the Good Grief Algorithm*, Human Language Technologies 2007: The Conference of the North American Chapter of the Association for Computational Linguistics, Apr. 22-27, 2007, pp. 300-3007.
Peter D. Turney, *Thumps up or Thumbs down? Semantic Orientation Applied to Unsupervised Classification of Reviews*, Proceedings of the 40th Annual Meeting of the Association for Computational Linguistics (ACL), Jul. 2002, pp. 417-424.
Janyce M. Wiebe, *Learning Subjective Adjectives from Corpora*, Proceedings of the Seventeenth National Conference on Artificial Intelligence (AAAI-2000), 2000, pp. 735-740.
Li Zhuang et al., *Movie Review Mining and Summarization*, ACM 15th Conference on Information and Knowledge Management, Nov. 6-11, 2006, pp. 43-50.
PCT International Search Report and Written Opinion, PCT/US2009/031901, Mar. 3, 2009, 8 Pages.
PCT International Search Report and Written Opinion, PCT/US2009/032061, Mar. 27, 2009, 9 Pages.
Lui, B., et al., "Opinion Observer: analyzing and comparing opinions on the Web," Proceedings of the 14th International Conference on World Wide Web, May 10-14, 2005, ACM, pp. 342-351.
Balog, K. et al, "Why are they excited? Identifying and Explaining Spikes in Blog Mood Levels," Proceeding EACL '06 Proceedings of the Eleventh Conference of the European Chapter of the Association for Computational Linguistics: Posters & Demonstrations, 2006, 4 pages, ISLA, University of Amsterdam, Netherlands.
"MPQA Releases—Corpus and Opinion Recognition System," 2 pages, [Archived on web.archive.com on Dec. 6, 2007] [online] [Retrieved on Nov. 12, 2010] Retrieved from the Internet <URL:http://web.archive.org/web/20071206160223/http://www.cs.pitt.edu/mpqa/>.
Kim, S.-M., et al, "Determining the Sentiment of Opinions," Proceedings of the COLING Conference, 2004, pp. 1-8, Geneva.
Koppel, M. et al., "Good News or Bad News? Let the Market Decide," Dept. of Computer Science, 2006, 5 pages, Bar-Ilan University, Ramat-Gan, Israel.
Lee, L., "A Matter of Opinion: Sentiment Analysis and Business Intelligence (position paper)," Presented at the IBM Faculty Summit on the Architecture of On-Demand Business, May 17-18, 2004, 2 pages, Cornell University.
Mishne, G. et al., "MoodViews: Tools for Blog Mood Analysis," American Associate for Artificial Intelligence, 2006, 2 pages, ISLA, University of Amsterdam, Netherlands.
"Moodgrapher," MoodViews: Tools for Blog Mood Analysis, 2005, 1 page, [Archived on web.archive.com on Dec. 14, 2007] [online] [Retrieved on Nov. 12, 2010] Retrieved from the Internet <URL:http://web.archive.org/web/20071214004346/http://www.moodviews.com/Moodgrapher/>.
Nasukawa, T. et al., "Sentiment Analysis: Capturing Favorability Using Natural Language Processing," Proceedings of the 2nd International Conference on Knowledge Capture, 2003, pp. 70-77, Sanibel Island, FL, USA.
Nielsen Buzzmetrics: The Global Measurement Standard in Consumer-Generated Media, BuzzMetrics, 2007, 1 page, [Archived on web.archive.com on Dec. 10, 2007] [online] [Retrieved on Nov. 12, 2010] Retrieved from the Internet <URL:http://web.archive.org/web/20071210041849/http://www.nielsenbuzzmetrics.com/>.
Opinmind.com, 1 page [Archived on web.archive.com on Dec. 23, 2007] [online] [Retrieved on Nov. 12, 2010] Retrieved from the Internet <URL:http://web.archive.org/web/20071223003722/http://www.opinmind.com/>.
Pang, B. et al, "A Sentimental Education: Sentiment Analysis Using Subjectivity Summarization Based on Minimum Cuts," ACL '04 Proceedings of the 42nd Annual Meeting on Association for Computational Linguistics, 2004, 8 pages, Dept. of Computer Science, Cornell University, Ithaca, NY.
Popescu, A. et al., "OPINE: Mining Product Reviews," 1 page, [Archived on web.archive.com on Jan. 14, 2008] [online] [Retrieved on Nov. 12, 2010] Retrieved from the Internet <URL:http://web.archive.org/web/20080114065434/http:///www.cs.washington.edu/research/knowitall/opine/>.
Rottentomatoes.com, 1998, 2 pages, [Archived on web.archive.com on Dec. 5, 2007] [online] [Retrieved on Nov. 12, 2010] Retrieved from the Internet <URL:http://web.archive.org/web/20071205114734/http://www.rottentomatoes.com/>.
Textmap.com, "The entity search engine," 1 page, 2007, [Archived on web.archive.com on Dec. 27, 2007] [online] [Retrieved on Nov. 12, 2010] Retrieved from the Internet <URL:http://web.archive.org/web/20071227081734/http://textmap.com/>.
Aue, A., et al., "Customizing Sentiment Classifiers to New Domains: a Case Study," Submitted to RANLP-05, the International Conference on Recent Advances in Natural Language Processing, 2005, 6 pages.
Hu, M., et al., "Mining and Summarizing Customer Reviews," Proceedings of the tenthACM SIGKDD international conference on Knowledge discovery and data mining, 2004, 10 pages.
Kamps, J., et al., "Using WordNet to Measure Semantic Orientations of Adjectives," Proceedings of the 4th International Conference on Language Resources and Evaluation LREC04, 2004, 4 pages.

Tan, S., et al., "A Novel Scheme for Domain-transfer Problem in the context of Sentiment Analysis," Proceedings of the sixteenth ACM conference on Conference on information and knowledge management, 2007, pp. 979-982.

Tang, H., et al., "A survey on sentiment detection of reviews," Expert Systems with Applications, vol. 36, Issue 7, Sep. 2009, pp. 10760-10773.

Na, J.C., et al., "A Sentiment-Based Meta Search Engine," Proceedings of the Asia-Pacific Conference on Library & Information Education & Practice, Apr. 3-6, 2006, pp. 83-89.

Na, J.C., et al., "Sentiment-Based Search in Digital Libraries," JCDL'05, Jun. 7-11, 2005, pp. 143-144.

\* cited by examiner

PHRASE BASED SNIPPET GENERATION

BACKGROUND OF THE INVENTION

1. Field of the Invention

This invention pertains in general to natural language processing and in particular to detecting sentiment in documents for snippet generation.

2. Description of the Related Art

A snippet is a segment of a document used to summarize an entity or document associated with search results. Snippets allow the users of a search engine to quickly assess the content of the search results in order to identify the search results that are of greatest interest to them. Snippet text is usually selected on the basis of keywords, word frequencies and words or phrases that signify summarization such as "in sum" or "overall". Snippet text is also selected based on a number of other factors including the length of the snippet as defined by the size of the display.

Users of search engines often perform searches for entities such as hotels, restaurants and consumer products. These entities are considered "reviewable" as public opinion or sentiment is often expressed about them in websites such as review websites and personal web pages. For reviewable entities, sentiment forms a special type of summarization. Consequently, the sentiment expressed in one or more reviews provides valuable information for inclusion in snippets generated for reviewable entities.

Sentiment information included in snippets should be representative of the opinion expressed about the reviewable entity over several reviews while including non-redundant sentiment information. Further, sentiment information should be readable and easily understandable. Lastly, each piece of sentiment information should be as concise as possible in order to allow for the inclusion of the maximum amount of sentiment information for each snippet.

BRIEF SUMMARY OF THE INVENTION

The described embodiments provide a method, system and computer program product that generate a snippet for an entity, wherein each snippet comprises a plurality of sentiments about the entity.

One aspect provides a computer-implemented method of generating a snippet for an entity, wherein each snippet comprises a plurality of sentiments about the entity. Initially, one or more textual reviews associated with the entity are selected. A plurality of sentiment phrases based on the one or more textual reviews, wherein each sentiment phrase comprises a sentiment about the entity, are identified. One or more sentiment phrases from the plurality of sentiment phrases are selected and a snippet is generated and stored based on the selected one or more sentiment phrases.

In another aspect, the described embodiments provide a system for generating a snippet for an entity, wherein each snippet comprises a plurality of sentiments about the entity. The system comprises a database comprising one or more textual reviews associated with the entity. The system further comprises a phrase extraction module adapted to identify a plurality of sentiment phrases based on the one or more textual reviews, wherein each sentiment phrase comprises a sentiment about the entity. The system further comprises a snippet generation module adapted to select one or more sentiment phrases from the plurality of sentiment phrases. The snippet generation module is further adapted to generate a snippet based on the selected one or more sentiment phrases and store the snippet.

Another aspect is embodied as a computer-readable storage medium on which is encoded computer program code for generating a snippet for an entity, wherein each snippet comprises a plurality of sentiments about the entity, according to the above described method.

The features and advantages described in this summary and the following detailed description are not all-inclusive. Many additional features and advantages will be apparent to one of ordinary skill in the art in view of the drawings, specification, and claims hereof.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
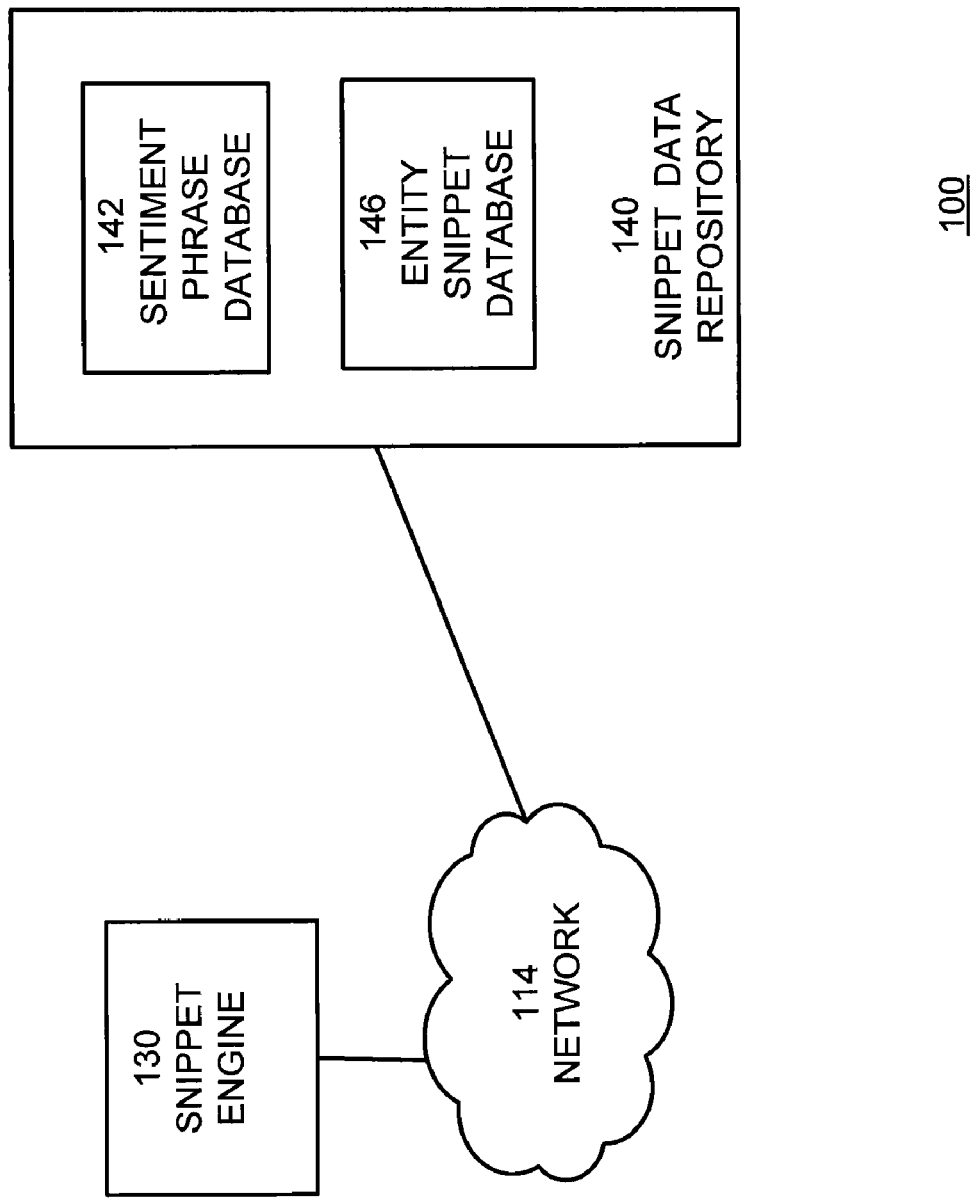
FIG. 1 is a high-level block diagram of a computing environment 100 according to one embodiment of the present invention.

FIG. 1 is a high-level block diagram of a computing environment 100 according to one embodiment. FIG. 1 illustrates a Snippet Data Repository 140 and a Snippet Engine 130 connected to a Network 114. Although FIG. 1 illustrates the Snippet Engine 130 as a single engine, in some embodiments the Snippet Engine 130 can have multiple engines. Likewise, there can be several Snippet Data Repositories 140 on the Network 114. Only one of each entity is illustrated in order to simplify and clarify the present description. There can be other entities on the Network 114 as well. In some embodiments, the Snippet Engine 130 and Snippet Data Repository 140 are combined into a single entity.

The Snippet Data Repository 140 includes a Sentiment Phrase Database 142 and an Entity Snippet Database 142. The Sentiment Phrase Database 142 stores Textual Reviews 310 from structured reviews and unstructured reviews of a Reviewable Entity 315. Reviewable Entities 315 include any person, place or thing about which opinion is likely to be expressed such as restaurants, hotels, consumer products such as electronics, films, books and live performances. The Entity Snippet Database 142 stores Snippets 427 containing Sentiment Phrases 317 from the Textual Reviews 310. A Sentiment Phrase 317 contains one or more sentiments in reference to a Reviewable Entity 315. Sentiments are words or text which express an attitude about something, such as an opinion.

Structured reviews are known reviews of the Reviewable Entity 315 which adhere to a specific format including a defined rating of the reviewable entity and/or a textual review of the Reviewable Entity 315. A structured review will typically have a format such as:, "F−; The pizza was horrible. Never going there again." In this instance, F− corresponds to the rating and "The pizza was horrible. Never going there again" corresponds to the Textual Review 310. Structured reviews are collected through the Network 114 from known review web sites such as TripAdvisor, Citysearch or Yelp. Structured reviews can also be collected from other types of textual documents such as the text of books, newspapers and magazines.

Unstructured reviews are textual documents which reference the Reviewable Entity 315 that have a high likelihood of containing an opinion about the Reviewable Entity 315. Unstructured reviews contain a Textual Review 310 but not a rating. Unstructured reviews usually contain sentiment expressed in documents with less structured formats than review websites such as newsgroups or blogs. Unstructured reviews are obtained through the Network 114 from sources of textual information which reference the entities including, but not limited to, web pages and/or portions of web pages, blogs, emails, newsgroup postings, and/or other electronic messages, etc. In some embodiments, unstructured reviews are analyzed to produce values which indicate the likelihood that the unstructured review pertains to the Reviewable Entity 315 and the unstructured review contains a sentiment or opinion about the Reviewable Entity 315.

The Textual Reviews 310 associated with each Reviewable Entity 315 are processed to identify Sentiment Phrases 317. The Sentiment Phrases 317 are stored in association with the Textual Reviews 310 in the Entity Sentiment Database 142. Sentiment Phrases 317 are short, easily-readable phrases which provide synopsis of a Textual Review 310 (e.g. "great setting", "clean rooms", "fantastic debut", "an interesting book"). Sentiment Phrases 317 contained in the Textual Reviews 310 are identified using Natural Language Processing (NLP) techniques.

The Snippet Data Repository 140 further stores an Entity Snippet Database 146. The Entity Snippet Database 146 stores one or more Snippets 427 for each Reviewable Entity 315. The Snippets 427 in the Entity Snippet Database 427 stored in association with the Entity IDs and Entity Type 302. Each Snippet 427 contains one or more Sentiment Phrases 317. An example Snippet 427 for a Reviewable Entity 315 of Entity Type 302 "pizza joint" may be "fantastic pizza, excellent atmosphere, good prices".

The Snippets 427 in the Entity Snippet Database 146 are displayed responsive to search queries on the Reviewable Entity 315 or the Entity Type 302. For example, the Snippet 427 for a Reviewable Entity 315 may be displayed responsive to a search for the Reviewable Entity 315. The Snippet 427 for an Reviewable Entity 315 may also be displayed responsive to a search for the Entity Type 302. Using the example above, the Snippet 427 may be displayed responsive to a search for "pizza joints".

The Snippet Engine 130 supports snippet generation based on Textual Reviews 310 associated with Reviewable Entities 315. The Snippet Engine 130 uses the Textual Review 310 in the Sentiment Phrase Database 142 to identify Sentiment Phrases 317 that summarize sentiment expressed about Reviewable Entities 315. The Snippet Engine 130 is adapted to generate Sentiment Scores 312 based on sentiment contained in the Sentiment Phrases 317. The Snippet Engine 130 further selects Sentiment Phrases 317 to generate Snippets 427.

The Network 114 represents the communication pathways among the Snippet Data Repository 140, the Snippet Engine 130, and any other entities connected to the Network 114. In one embodiment, the Network 114 is the Internet. The Network 114 can also utilize dedicated or private communications links that are not necessarily part of the Internet. In one embodiment, the Network 114 uses standard communications technologies and/or protocols. Thus, the Network 114 can include links using technologies such as Ethernet, 802.11, integrated services digital network (ISDN), digital subscriber line (DSL), asynchronous transfer mode (ATM), etc. Similarly, the networking protocols used on the Network 114 can include multiprotocol label switching (MPLS), the transmission control protocol/Internet protocol (TCP/IP), the hypertext transport protocol (HTTP), the simple mail transfer protocol (SMTP), the file transfer protocol (FTP), the short message service (SMS) protocol, etc. The data exchanged over the network 114 can be represented using technologies and/or formats including the HTML, the extensible markup language (XML), the Extensible Hypertext markup Language (XHTML), the compact HTML (cHTML), etc. In addition, all or some of links can be encrypted using conventional encryption technologies such as the secure sockets layer (SSL), HTTP over SSL (HTTPS), and/or virtual private networks (VPNs). In other embodiments, the Snippet Data Repository 140 and the Snippet Engine 130 use custom and/or dedicated data communications technologies instead of, or in addition to, the ones described above.

Figure 2:
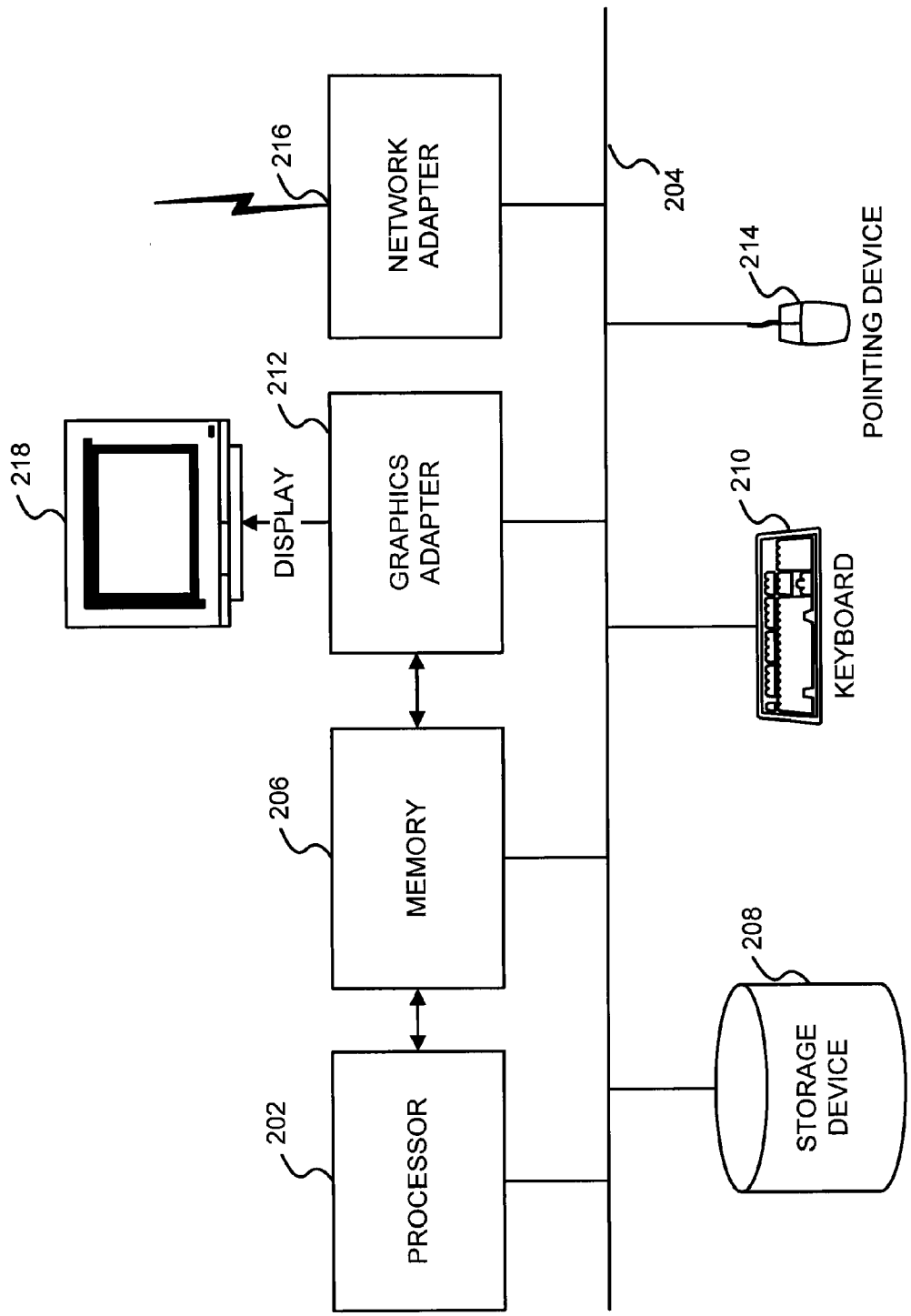
FIG. 2 is a high-level block diagram illustrating a functional view of a typical computer 200 for use as the Snippet Engine 130 and/or Snippet Data Repository 140 illustrated in the environment of FIG. 1 according to one embodiment.

FIG. 2 is a high-level block diagram illustrating a functional view of a typical computer 200 for use as the Sentiment Phrase Database 142 and/or the Entity Snippet Database 146 illustrated in the environment 100 of FIG. 1 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer 200 to the Network 114.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 used by the entities of FIG. 1 can vary depending upon the embodiment and the processing power required by the entity. The Snippet Engine 130 can include one or more distributed physical or logical computers operating together to provide the functionalities described herein. Likewise, the data repository 140 can be provided by a storage area network (SAN), database management system (DBMS), or another storage system. The computers 200 can lack some of the components described above, such as keyboards 210, graphics adapters 212, and displays 218.

Figure 3:
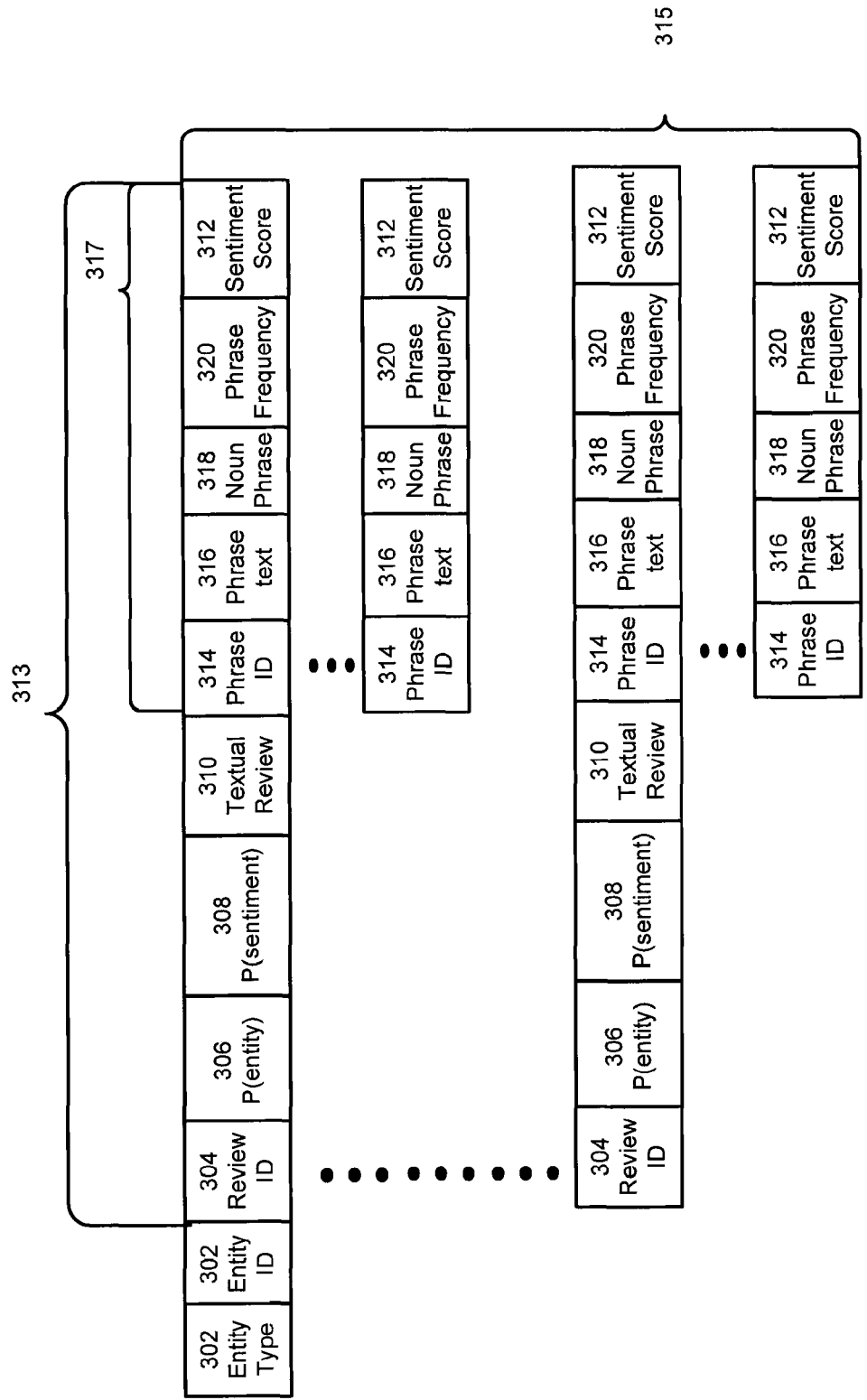
FIG. 3 illustrates the storage of sentiment data associated with textual reviews of a Reviewable Entity 315 in the Sentiment Phrase Database 142 according to one embodiment.

FIG. 3 illustrates the storage of sentiment phrases associated with textual reviews of an entity in the Sentiment Phrase Database 142 according to one embodiment. Each Reviewable Entity 315 is represented by a tuple in the Sentiment Phrase Database 142. A tuple consists of an Entity ID 302, an Entity Type 300 and one or more Reviews 313. Each Review 313 consists of a Review ID 204, a P(entity) value 306, a P(sentiment) value 308, a Textual Review 310 and one or more Sentiment Phrases 317. Each Sentiment Phrase 317 contains a Phrase ID 314, a Phrase Text 316, a Noun Phrase 318, a Phrase Frequency 320 and a Sentiment Score 312. The Entity ID 302 is any kind of unique identifier that uniquely identifies (e.g., as a primary key in the Sentiment Phrase Database 142) a Reviewable Entity 315, such as an alphanumeric string, bit string, or the like, or a combination of data specific to the Reviewable Entity 315 such as name, location or owner.

Entity Type 300 is a categorical variable used to define the type of Reviewable Entity 315 in order to facilitate Entity Type 300 specific search. Entity Types 300 specify the domain to be used in domain specific sentiment classification. The Entity Type 300 can represent any type of Reviewable Entity 315 such as a place, service or consumer product. Example Entity Types 300 may include hotels, films, restaurants and cameras. In alternate embodiments, there may be more than one Event Type 300 associated with each Reviewable Entity 315.

The Review ID 304 can be any unique identifier which uniquely identifies the Review 313 (e.g. a primary key in a Sentiment Phrase Database 142). The Review ID 304 may include any combination of information which identifies the Review 313 including the author of the Review 313, the source from which the Review 313 was obtained, the Entity ID 302 and the date of the Review 313.

The P(entity) value 306 represents the likelihood that the Review 313 is a review of the Reviewable Entity 315. For Reviews 313 including Textual Reviews 310 from unstructured reviews, the P(entity) value 306 can be a function of any information regarding the Review 313 such as the source of the Review 313 or the author of the Review 313. The P(entity) value 306 can also be determined based on any metric generated from the analysis of the Textual Review 310, such as the number of times the Reviewable Entity 315 is mentioned in the Textual Review 310. According to the embodiment, the P(entity) value 306 may be a categorical (high, medium, low) or a numeric value. For Reviews 313 obtained from high quality or structured reviews, the P(entity) value 306 may be set to the corresponding numeric or categorical value which denotes the highest likelihood that the Review 313 pertains to the Reviewable Entity 315.

The P(sentiment) value 308 represents the likelihood that the Review 313 contains a sentiment about the Reviewable Entity 315. For Reviews 313 including Textual Reviews 310 from unstructured reviews, the P(sentiment) value 306 can be a function of any information regarding the Review 313 such as the source of the Review 313 or the author of the Review 313. According to the embodiment, the P(sentiment) value 306 may be a categorical (e.g. high, medium, low) or a numeric value. For Reviews 313 including Textural Reviews 310 from high quality or structured reviews, the P(sentiment) value may be set to the corresponding numeric or categorical values which denotes the highest likelihood that the Review 313 pertains to the Reviewable Entity 315. For example, using a P(sentiment) value from a Review 313 obtained from a review website such as Yelp or TripAdvisor would be given a P(sentiment) value of 1, indicating a 100% likelihood that the Review 313 contains sentiment about the entity.

The Textual Review 310 includes the body of text that has been identified as a Review 313 of the Reviewable Entity 315. In one embodiment, the Textual Review 310 is tokenized to produce a set of tokens and each token is subject to part of speech (POS) tagging in order to associate the proper part of speech with the token. Any type of part of speech tagger maybe used to tag the tokens including probabilistic taggers, hard taggers and soft taggers. In a specific embodiment, the set of tokens comprising the Textual Review 310 are tagged using a probabilistic tagger and the following notation:

Q is used to denote tokens representing Punctuation or Phrase-Breaking Markers.
P is used to denote tokens representing Pronouns other than "you".
Y is used to denote tokens representing the Pronoun "you".
M is used to denote tokens representing Modal Verbs (e.g., 'can').
A is used to denote tokens representing Adjectives.
R is used to denote tokens representing Adverbs.
N is used to denote tokens representing Nouns.
V is used to denote tokens representing Verbs.
O is used to denote tokens representing parts-of-speech that are other than the above listed parts-of-speech or unknown.

In some embodiments, the tokens comprising the Textual Review 310 are processed using a variety of natural language processing (NLP) techniques such as stemming, word sense disambiguation and compound recognition. Other applicable techniques will be readily apparent to those skilled in the art of natural language processing (NLP).

The Snippet Engine 130 processes each Textual Review 310 to identify one or more Sentiment Phrases 317. The identification of Phrase Texts 316 is discussed in detail below with respect to step 614 in FIG. 6. The Phrase ID 314 is a unique identifier used to identify the Phrase Text 316 such as a database primary key.

The textual content of the identified Sentiment Phrases 317 is stored as Phrase Texts 316. During Sentiment Phrases 317 identification, the Noun Phrase 318 of the Sentiment Phrase 317 is also identified and stored 318. The Noun Phrase 318 of the Sentiment Phrase 317 is the identified single token representing a noun or set of tokens that functions as a noun in the Phrase Text 316. The Noun Phrase 318 may consist of a Noun, a Noun with an Adjective or a Noun with an Adjective and an Adverb.

The Phrase Frequency 320 represents the number of times a Sentiment Phrase 317 is in a Review 313 associated with the Reviewable Entity 315. Phrase Frequency 320 is enumerated and stored for each Sentiment Phrase 317. In one embodiment, Phrase Frequency 320 is enumerated based on the exact match of the Phrase Text 316 of the Sentiment Phrase 317. In alternate embodiments, the Phrase Frequency 320 is enumerated based on the Noun Phrase 318 of the Sentiment Phrase 317.

In some embodiments, a decay function is used to generate the Phrase Frequencies 320. The decay function is applied to Sentiment Phrases 317 that occur over a specified number of times (e.g. over three times). Any type of linear or non-linear decay function can be used to weight frequently occurring Sentiment Phrases 317. In a specific embodiment, the decay function used to generate Phrase Frequencies 320 is: (Frequency of the Sentiment Phrase 317)*(1+log(# of Reviews 313 the Sentiment Phrase 317 occurs in)

Each Sentiment Phrase 317 is further associated with a Sentiment Score 312. Sentiment Scores 312 are used to represent the type of sentiment and the magnitude of the sentiment contained in the Phrase Texts 316. In one embodiment, type of sentiment is partitioned into two categories which represent the polarity (i.e. positive or negative) of the sentiment. Magnitude of sentiment is expressed as a value on a scale of 1 to 5. Magnitude of sentiment and polarity of sentiment are combined to create a scale in which −5 represents the strongest negative sentiment; −1 represents the weakest negative sentiment; +1 represents the weakest positive sentiment and +5 represents the strongest positive sentiment. Other representations of type and magnitude of sentiment will be well known to those skilled in the art. For example, other representations may further partition sentiment into multiple other types of sentiment or use different scales to or categorical variables to represent magnitude of sentiment.

Figure 4:
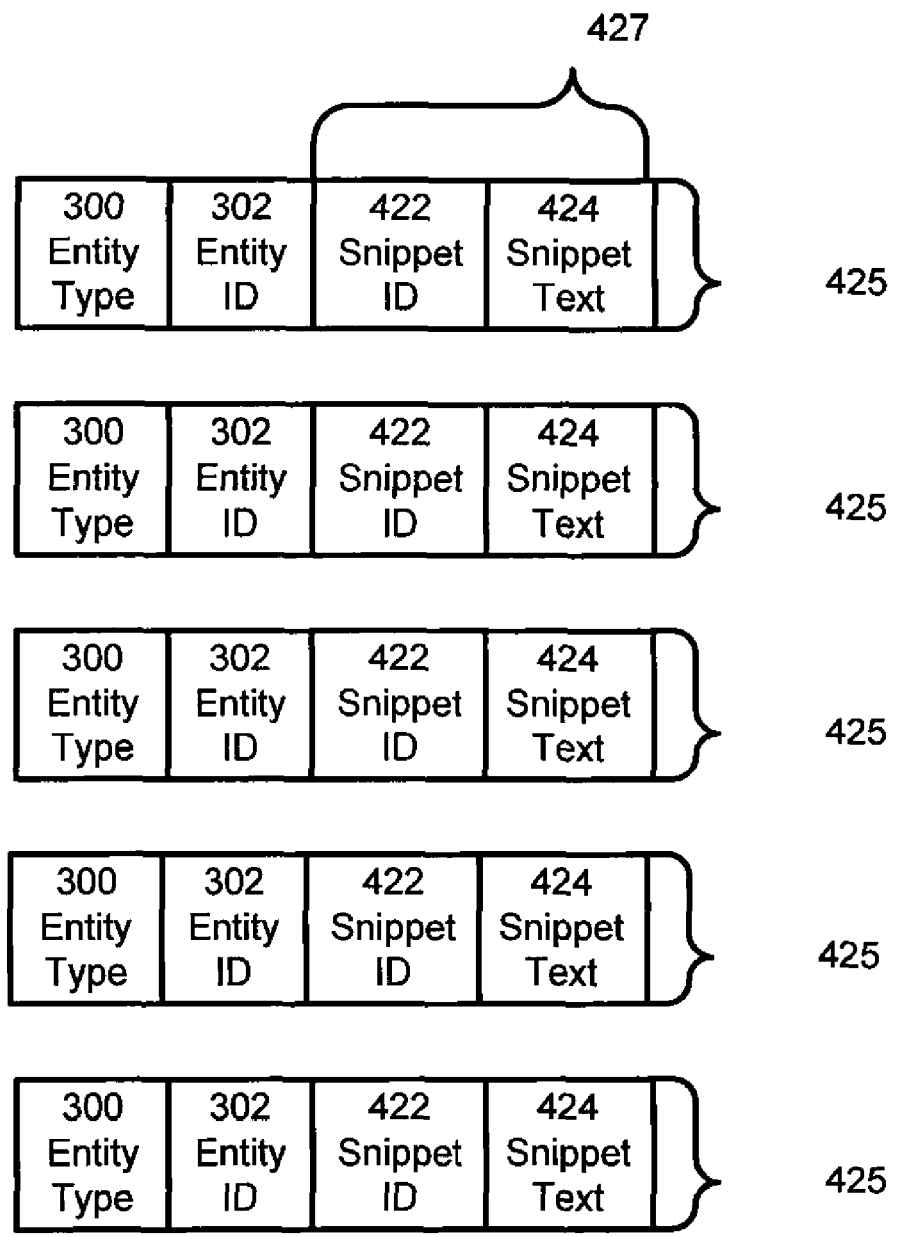
FIG. 4 illustrates the storage of Entity Snippets 425 in the Entity Snippet Database 146 according to one embodiment.

FIG. 4 illustrates the storage of Entity Snippets 425 in the Entity Snippet Database 146 according to one embodiment. Each Entity Snippet 425 is represented by a tuple in the Entity Snippet Database 146. A tuple consists of an Entity ID 302, an Entity Type 300, and one or more Snippets 427. Each Snippet 427 contains a Snippet ID 422 and Snippet Text 424. The Snippet ID 422 can be any information used to uniquely identify the snippet (e.g. a primary key in the Entity Snippet Database 146). The Snippet Text 424 contains the set of tokens to be included in the Snippet 427 displayed to the user with a search result associated with the Entity 302.

Figure 5:
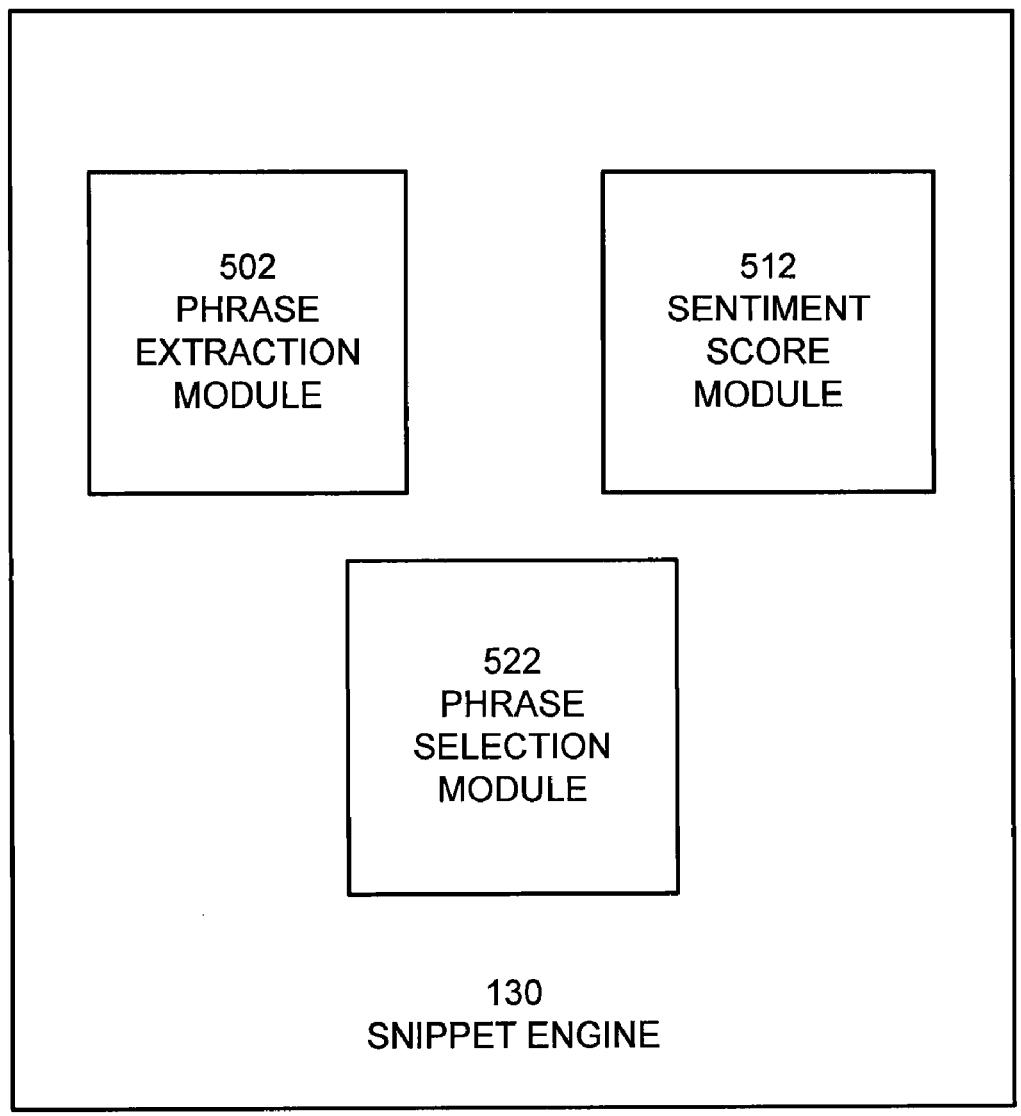
FIG. 5 is a high-level block diagram illustrating modules within the Snippet Engine 130 according to one embodiment.

FIG. 5 is a high-level block diagram illustrating modules within the Snippet Engine 130 according to one embodiment.

A Phrase Extraction Module 502 is used to identify one or more Sentiment Phrases 317 from the Textual Review 310 and store the Sentiment Phrases 317 in the Sentiment Phrase Database 142. In one embodiment, the Phrase Extraction Module 502 runs as a batch program whenever new Reviews 313 are added to the Sentiment Phrase Database 142. Identification of Sentiment Phrases 317 based on Textual Reviews 310 is discussed in detail with respect to step 614 of FIG. 6.

The Sentiment Score Module 512 communicates with the Sentiment Analysis Engine 810 to generate Sentiment Scores 312 for each Phrase Text 316. The Sentiment Score Module 512 generates domain-specific Sentiment Scores 312 based on the Phrase Texts 316 and the Entity Types 300 which specify the domain of the entity. Suitable methods of generating domain-specific Sentiment Scores 312 are described in detail below with respect to FIGS. 8-12. The Sentiment Score Module 512 stores generated Sentiment Scores 312 in the Entity Sentiment Database 142.

The Phrase Selection Module 522 selects a set of Sentiment Phrases 317 used to generate Entity Snippets 427. The Phrase Selection Module 522 uses a greedy algorithm to select a set of Sentiment Phrases 317 based on Phrase Frequency 320 and Sentiment Score 312. The Phrase Selection Module 522 stores the generated Entity Snippets 427 in the Entity Snippet Database 146.

Figure 6:
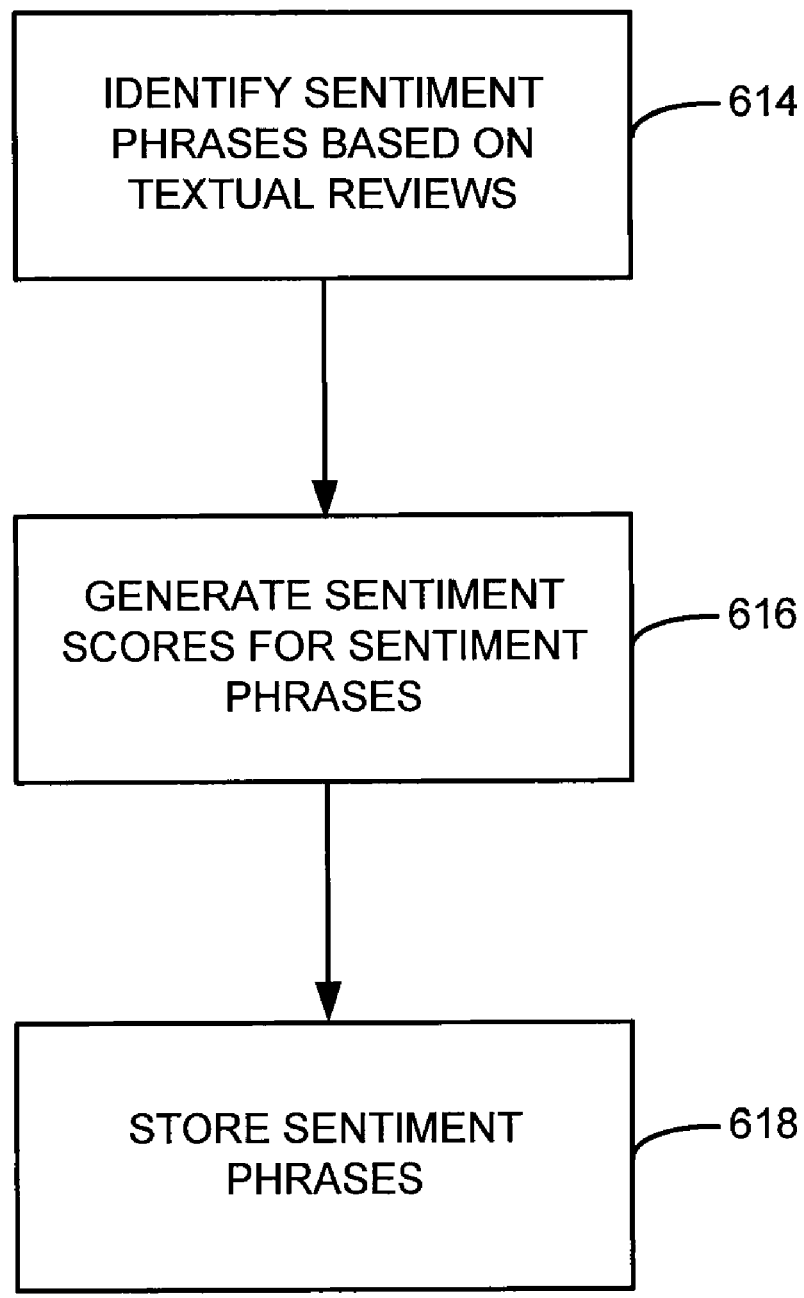
FIG. 6 is a flowchart illustrating a more detailed view of steps performed by an embodiment of the Snippet Engine 130 in generating Sentiment Phrases 317.

FIG. 6 is a flowchart illustrating a more detailed view of steps performed by an embodiment of the Snippet Engine 130 in generating Sentiment Phrases 317. Other embodiments perform additional and/or different steps that the ones described in the figure. In addition, other embodiments perform the steps in different orders and/or perform multiple steps concurrently.

A Phrase Extraction Module 502 identifies 614 one or more Sentiment Phrases 317 from the Textual Review 310. The Phrase Extraction Module 502 takes as input the set of part-of-speech tagged tokens in the Textual Reviews 310. In one embodiment, the Phrase Extraction Module 502 uses a set of regular expression to extract Sentiment Phrases 317. In a specific embodiment, the Phrase Extraction Module uses the regular expressions to extract Sentiment Phrases 317. The following regular expressions are given in standard regular expression notation. In this notation, the second set of parentheses represents the text that is extracted.

| | |
|---|---|
| Adjective+Noun: "(.*?)(A+N+)( )" (e.g. great pizza) | 1. |
| Adverb+Adjective+Noun: "(.*?)(R+A+N+)( )" (e.g. really great pizza) | 2. |
| Model Verb+Verb+Adjective+Noun: "(.*?)(MV?A+N+)( )" (e.g. can make a great pizza) | 3. |
| Pronoun+Verb+Adverb(optional)+Adjective+Noun: "(.*?)(PV?R*A+N+)( )" e.g. I love the really great pizza) | 4. |
| Punctuation+Verb+Adverb(optional)+Adjective+Noun, if preceded by punctuation: "(^\|.*?Q)(V+?R*A+N+)( )" (e.g. Love the great pizza) | 5. |
| Noun/Pronoun+Verb+Adverb(optional)+Adjective: "(.*?)((?: N+\|P)+V+R*A+)(Q\|$)" (e.g. the pizza is really great) | 6. |

In alternate embodiments, other methods of identifying Sentiment Phrases 317 are used. Alternate methods of identifying Sentiment Phrases 317 include using parsing techniques such as syntax trees or semantic grammars. It is expected that other methods of identifying Sentiment Phrases 317 will be apparent to those skilled in the art of Natural Language Processing in light of this disclosure.

The Sentiment Score Module 512 generates 616 Sentiment Scores 312 representing the polarity and magnitude of sentiment in each of the Sentiment Phrases 317. The Sentiment Analysis Engine 810 uses the Entity Type 300 to determine the domain-specific Sentiment Scores 312. The Sentiment Score Module 512 stores generated Sentiment Scores 312 as part of the Sentiment Phrases 317 in the Sentiment Phrase Database 142.

Figure 7:
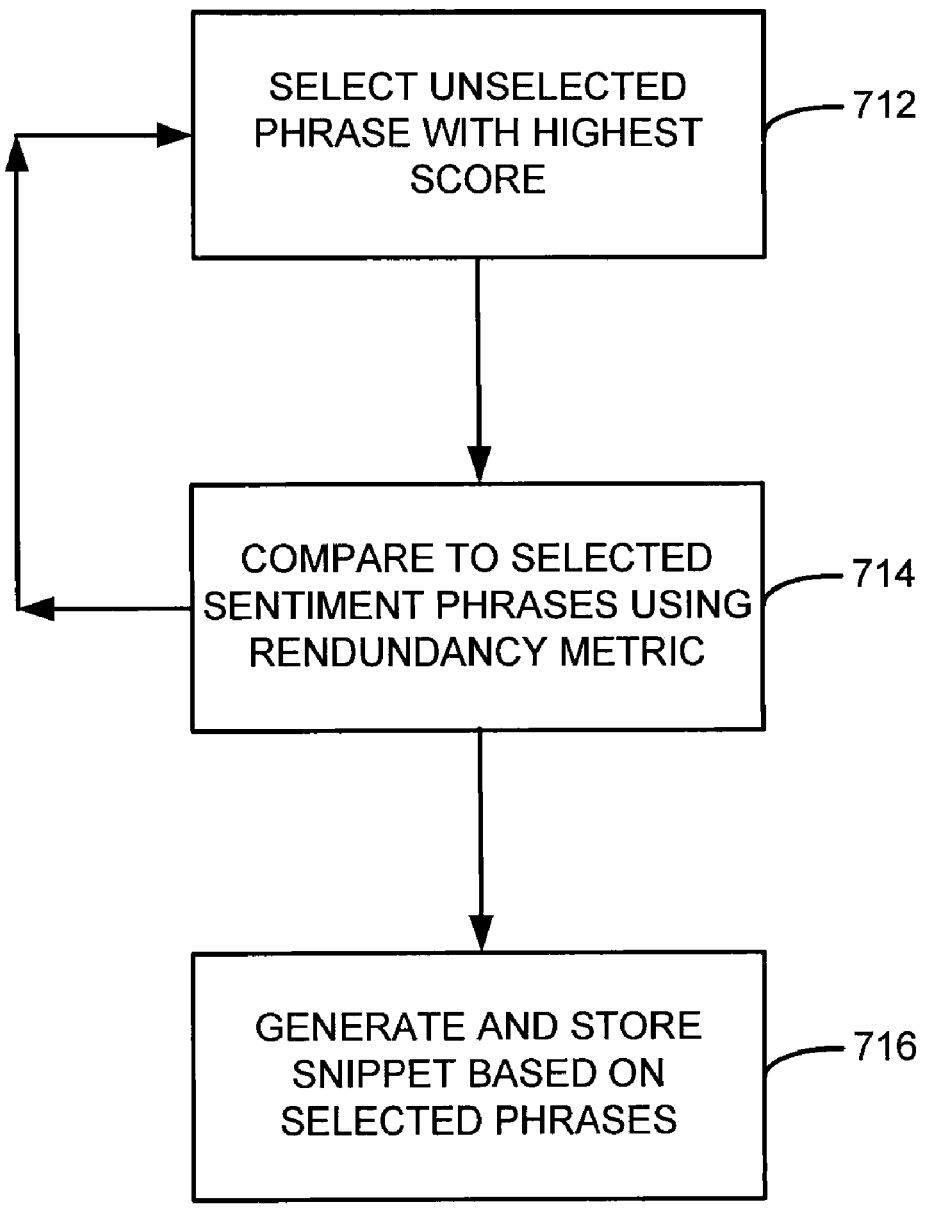
FIG. 7 is a flowchart illustrating a more detailed view of steps performed by an embodiment of the Snippet Engine 130 in generating Entity Snippets 427.

FIG. 7 is a flowchart illustrating a more detailed view of steps performed by an embodiment of the Snippet Engine 130 in generating Entity Snippets 427. Other embodiments perform additional and/or different steps that the ones described in the figure. In addition, other embodiments perform the steps in different orders and/or perform multiple steps concurrently.

The Phrase Selection Module 522 selects 712 the Sentiment Phrase 317 associated with the Reviewable Entity 315 based on the Sentiment Score 312 associated with the Sentiment Phrase 317. In some embodiments, the Sentiment Phrase 317 may be selected 712 based on the magnitude and polarity of the Sentiment Score 312 with Sentiment Phrases 317 having higher positive Sentiment Scores 312 being selected 712 first and Sentiment Phrases 317 with high negative Sentiment Scores 312 being selected 712 last. In other embodiments, the Sentiment Phrase 317 is selected based only on magnitude of the Sentiment Scores 312 with Sentiment Phases 317 with strong positive and negative Sentiment Scores 312 being selected first and Sentiment Phrases with low positive and negative Sentiment Scores 312 being selected last.

According to the embodiment, other scoring metrics may be used in conjunction with Sentiment Scores 312 to select 712 Sentiment Phrases 317. For example, Sentiment Phrases 317 may be selected 712 based on metrics such as inverse document frequency. Inverse document frequency is used to measure the relative occurrence of a Noun Phrase 318 over large set of documents, such as a global index of documents. Noun Phrases 318 which are frequently used (e.g. "excellent stuff") will have a higher document frequency in a global document index than Noun Phrases 318 containing less commonly used terms (e.g. "excellent tacos"). Therefore, the inverse document frequency is used to select 712 Noun Phrases 318 which are thought to have greater information content based on a lower document frequency in a large set of documents such as a global index of documents.

In some embodiments, all Sentiment Phrases 317 with the same Noun Phrase 318 are grouped into bins before selecting 712 the Sentiment Phrases 317 based on Sentiment Scores 312. In the above example, all phrases contain the noun phrase "pizza" and therefore would be binned into one group. For each group, the Sentiment Phrase 317 with the highest Phrase Frequency 320 is selected as a representative for the group. This method of binning Sentiment Phrases 317 potentially allows for the creation of groups containing wide range of sentiment as the noun phrase may contain different adjectives and adverbs (e.g. "bad pizza" or "disgustingly greasy pizza"). However, selection of the representative Sentiment Phrase 317 based on Phrase Frequency 320 eliminates results that are not consistent with the sentiment expressed in the majority of Reviews 313.

An alternate method of binning Sentiment Phrases 317 incorporates the polarity of the phrase as expressed in the Sentiment Score 312 in addition to the Noun Phrase 318. In these embodiments, two separate groups would be created for each Noun Phrase 318, one with positive Sentiment Scores 312 and another with negative Sentiment Scores 312. In the above example, "good pizza" and "great pizza" would be binned into one group while "bad pizza" and "tasteless pizza" would be binned in another group.

Other methods of binning include using stemmed Noun Phrases 318 and polarity of Sentiment Score 312, the head of the Noun Phrase 318 and polarity of Sentiment Score 312 and binning Sentiment Phrases 317 due to semantic similarity. Any type of metric of semantic similarity may be used to evaluate the Sentiment Phrases 317 based on Phrase Text 316 and bin them accordingly. Suitable methods of evaluating semantic similarity include mutual information analysis (MI), latent semantic analysis (LSA) and determining a common WordNet ancestor between two adjectives within a given depth in the WordNet hierarchy.

The Phrase Selection Module 522 then compares 714 the selected Sentiment Phrase 317 to the previously selected Sentiment Phrases 317 by generating a redundancy metric. In embodiments that use binning of Sentiment Phrases 317, this step is not as important as binning eliminates most redundancy between Sentiment Phrases 317.

In one embodiment, the Sentiment Phrases 317 are compared by calculating a Jaccard overlap as a redundancy metric. The Jaccard overlap is defined as: (# of common tokens between two Sentiment Phrases 317)/(number of unique tokens in the Sentiment Phrases 317)

Alternate methods of calculating redundancy metrics include methods of calculating distance metrics between the Sentiment Phrases 317 such as cosine distances and edit distances. It is expected that other suitable methods of calculating redundancy metrics will be apparent to those skilled in the art of natural language processing (NLP) in light of this disclosure.

If the selected Sentiment Phrase 317 has a redundancy metric above or below a specified threshold value, the Phrase Selection Module 522 will select Sentiment Phrase 317 for Entity Snippet 427 generation. In a specific embodiment, the Jaccard overlap is used as a redundancy metric with a threshold value of 0.5. If the selected Sentiment Phrase 317 has a redundancy metric that indicates redundancy, the Sentiment Phrase 317 is not added to the set of Sentiment Phrases 317 used for snippet generation.

The process of selecting the Sentiment Phrase 317 or the representative Sentiment Phrase 317 for a binned group and comparing the Sentiment Phrase 317 to the previously selected Sentiment Phrases 317 using a redundancy metric and selecting Sentiment Phrases 317 for Entity Snippet 427 generation will be repeated until a specified criteria is met. In some embodiments, the specified criteria is based on a number of Sentiment Phrases 317 to be used for Entity Snippet 427 generation. In other embodiments, the specified criteria is based on an optimal length of the Entity Snippet 427 to be generated. In these embodiments, the number of Sentiment Phrases 317 selected for Entity Snippet 427 generation is based on a maximum number of characters to be contained in the Entity Snippet 427. Therefore, the number of Sentiment Phrases 317 selected for Entity Snippet 427 is dependent on the number of characters in the set of tokens comprising the Sentiment Phrases 317.

The Phrase Selection Module 522 generates 716 an Entity Snippet 427 based on the selected Sentiment Phrases 317 with redundancy metrics below or above the specified threshold. The Sentiment Phrases 317 may be combined in any order to generate an Entity Snippet 427. In one embodiment, the order of Sentiment Phrases 317 in the Entity Snippet 427 will reflect the order of selection. That is, if the Sentiment Phrases 317 are selected by polarity and/or magnitude, the order of the Sentiment Phrases 317 in the Entity Snippet 427 will correspond to polarity and magnitude of the Sentiment Phrases 317. In some embodiments, the Entity Snippet 427 will contain Sentiment Phrase 317 ordered based on Noun Phrases 318. Alternate methods of ordering Sentiment Phrases 317 in Entity Snippets 427 will be apparent to those skilled in the art of natural language processing in light of this disclosure.

Figure 8:
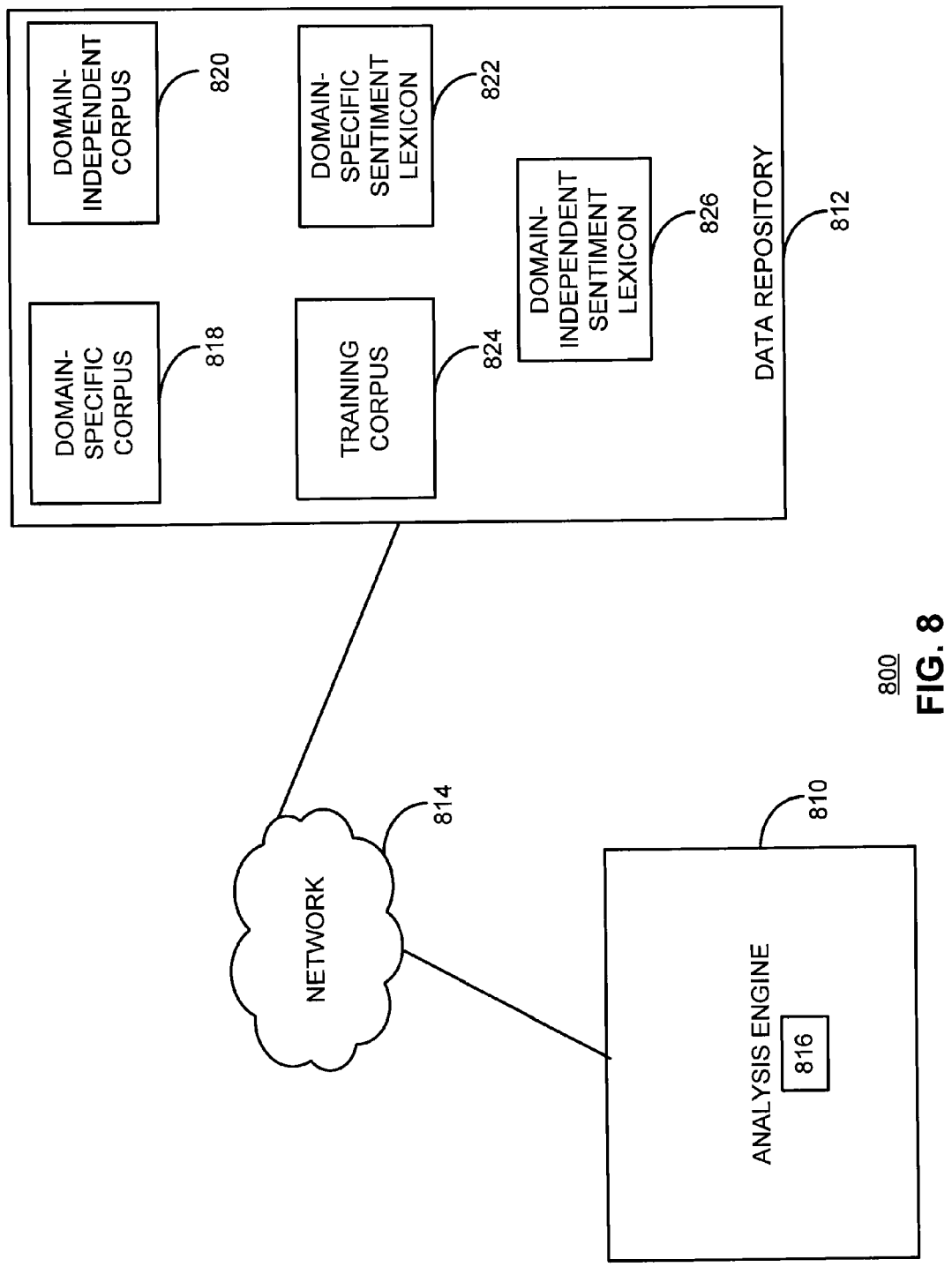
FIG. 8 is a high level block diagram illustrating a computing environment 800 to one embodiment.

FIG. 8 is a high-level block diagram of a computing environment 800 for generating Sentiment Scores 312 according to one embodiment. FIG. 8 illustrates an analysis engine 810 and a data repository 812 connected to a network 814. Although FIG. 8 illustrates only a single analysis engine 810, embodiments can have multiple engines. Likewise, there can be multiple data repositories on the network 814. Only one of each entity is illustrated in order to simplify and clarify the present description. There can be other entities on the network 814 as well. In some embodiments, the analysis engine 810 and data repository 812 are combined into a single entity.

The analysis engine 810 supports domain-specific sentiment classification for documents stored in the repository 812 and/or other locations. In one embodiment, the analysis engine 810 uses the documents in the repository 812 to identify a domain-specific sentiment lexicon 822 of n-grams. In addition, the analysis engine 810 uses the n-grams in the domain-specific sentiment lexicon 822 as features in a model in order to build a highly-accurate domain-specific sentiment classifier 816. The analysis engine 810 uses the classifier 816 to classify the sentiment of documents stored in the repository 812 and/or on the network 814. In one embodiment, the analysis engine 810 is controlled by an administrator or other user who uses it to build the classifier 816 and/or perform automated sentiment classification of documents.

The data repository 812 stores documents and other data utilized by the analysis engine 810 to build a domain-specific sentiment classifier 816. In one embodiment, the data repository 812 stores sets of documents organized into various corpora. The corpora include a domain-specific corpus 818 holding domain-specific documents and a domain-independent corpus 820 holding domain-independent (i.e., non-specific) documents. In one embodiment, the domain-specific corpus 818 contains enough documents to constitute a representative sample of how sentiment is expressed in the domain. Likewise, the domain-independent corpus 820 contains enough documents to constitute a representative sample of how sentiment is expressed generally, exclusive of any specific domain.

As used herein, the term "domain" refers to a particular sphere of activity, concern or function, such as restaurants, electronic devices, international business, and movies. The term "domain" does not necessarily refer to Internet domain names, although certain web sites at certain Internet domains might include documents related to a particular sphere of activity, concern or function.

In one embodiment, both corpora hold documents obtained via the network 814. The documents include web pages and/or portions of web pages, the text of books, newspapers, and magazines, emails, newsgroup postings, and/or other electronic messages, etc. For example, the documents in the domain-specific corpus 818 can include documents related to restaurants, such as portions of web pages retrieved from web sites specializing in discussions about restaurants. Likewise, the domain-specific documents in the corpus 818 can include web pages retrieved from web sites that include reviews and/or discussion related to portable electronic devices, such as mobile telephones and music players. In contrast, the documents in the domain-independent corpus 820 can include documents associated with a variety of different domains, so that no single domain predominates. In addition, the documents in the domain-independent corpus 820 can be drawn from sources unrelated to any particular source, such as general interest magazines or other periodicals.

In some embodiments, the corpora hold documents obtained from sources other than the network 814. Moreover, in some embodiments the corpora are virtual in the sense that they are not stored at a single location. For example, the domain-specific corpus 818 can be defined as the contents of one or more web sites devoted to restaurant reviews or other topics.

In one embodiment, the data repository 812 also includes the domain-specific sentiment lexicon 822 and a domain-independent sentiment lexicon 826. The domain-specific sentiment lexicon 822 contains a set of n-grams (i.e., words and/or phrases) that express sentiment in a particular domain. The domain-independent sentiment lexicon 826, in contrast, contains a set of n-grams that express sentiment in a general or non-specific domain. In one embodiment, each n-gram in the lexicons 822, 826 has an associated score indicating the polarity (i.e., positive or negative) and magnitude of the sentiment it expresses.

In one embodiment, the domain-independent sentiment lexicon 826 is based on a lexical database, such as the WordNet electronic lexical database available from Princeton University of Princeton, N.J. The lexical database describes mappings between related words. That is, the database describes synonym, antonym, and other types of relationships among the words. In one embodiment, the administrator selects initial terms for the domain-independent sentiment lexicon 826 by reviewing the lexical database and manually selecting and scoring words expressing high sentiment. The administrator initially selects about 360 such words in one embodiment although the number of words can vary in other embodiments. This initial set of words is expanded through an automated process to include synonyms and antonyms referenced in the lexical database. The expanded set of words constitutes the domain-independent sentiment lexicon 826.

An embodiment of the data repository 812 also includes a training corpus 824. In one embodiment, the training corpus 824 includes domain-specific documents labeled with corresponding sentiment scores. In some embodiments the domain-specific documents are manually labeled with sentiment scores. For example, in one embodiment the documents in the training corpus 824 are drawn from popular product review web sites such as Amazon, CitySearch, and Cnet. These sites include textual product reviews that are manually labeled by the review submitters with corresponding numeric or alphabetic scores (e.g., 4 out of 5 stars or a grade of "B−"). Further, in some embodiments the domain-specific documents are automatically labeled with sentiment scores. For example, in one embodiment the documents in the training corpus 824 include high-sentiment documents from the domain specific corpus 818 that are labeled with sentiment scores through an automated process as described below.

The network 814 represents the communication pathways among the analysis engine 810, the data repository 812, and any other entities connected to the network. In one embodiment, the network 814 is the Internet. The network 814 can also utilize dedicated or private communications links that are not necessarily part of the Internet. In one embodiment, the network 814 uses standard communications technologies and/or protocols. Thus, the network 814 can include links using technologies such as Ethernet, 802.11, integrated services digital network (ISDN), digital subscriber line (DSL), asynchronous transfer mode (ATM), etc. Similarly, the networking protocols used on the network 814 can include multiprotocol label switching (MPLS), the transmission control protocol/Internet protocol (TCP/IP), the hypertext transport protocol (HTTP), the simple mail transfer protocol (SMTP), the file transfer protocol (FTP), the short message service (SMS) protocol, etc. The data exchanged over the network 814 can be represented using technologies and/or formats including the HTML, the extensible markup language (XML), the Extensible Hypertext markup Language (XHTML), the compact HTML (cHTML), etc. In addition, all or some of links can be encrypted using conventional encryption technologies such as the secure sockets layer (SSL), HTTP over SSL (HTTPS), and/or virtual private networks (VPNs). In other embodiments, the analysis engine 810 and data repository 812 use custom and/or dedicated data communications technologies instead of, or in addition to, the ones described above.

Figure 9:
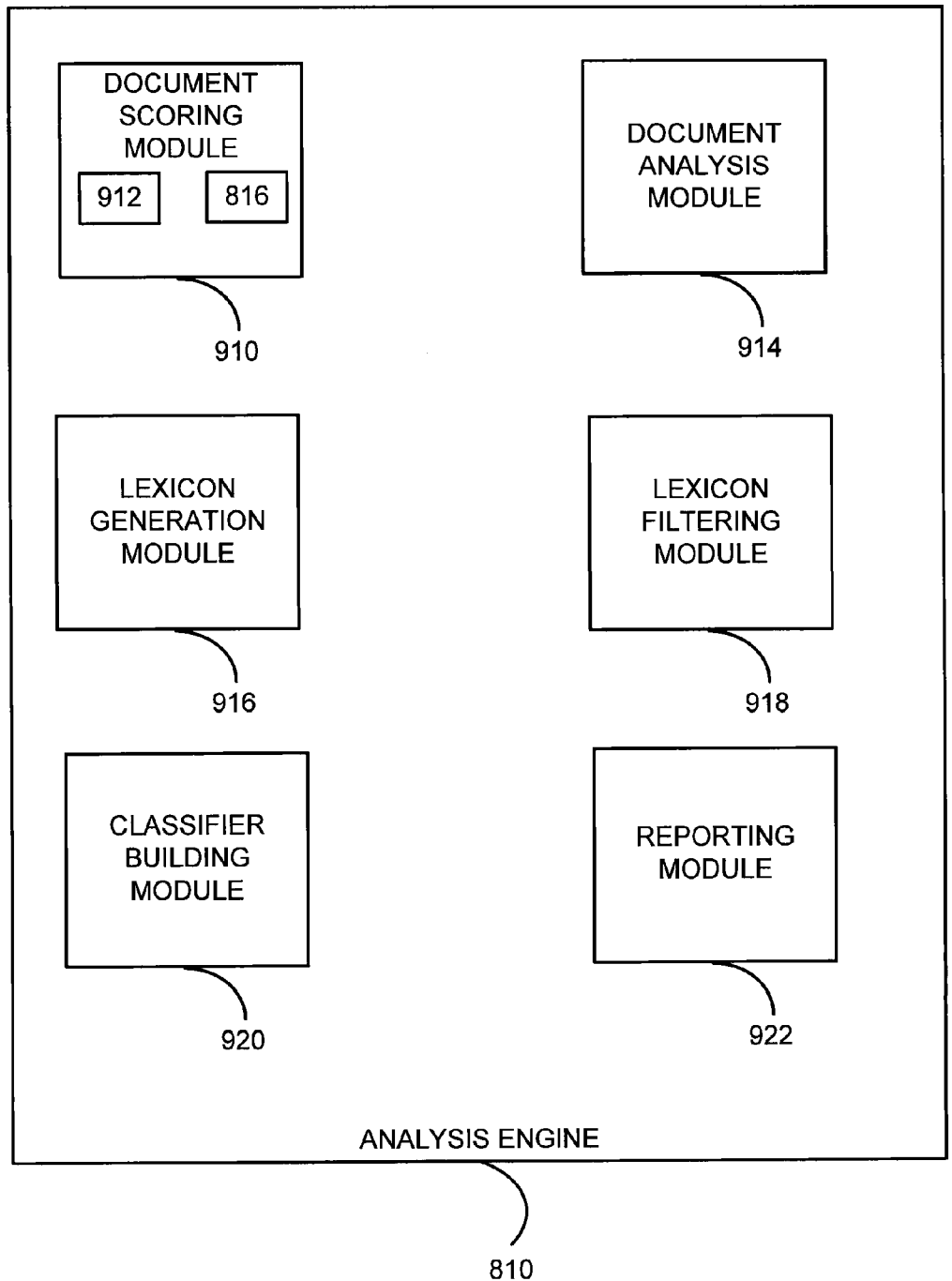
FIG. 9 is a high level block diagram illustrating an analysis engine 810 according to one embodiment.

FIG. 9 is a high-level block diagram illustrating modules within the analysis engine 810 according to one embodiment. Other embodiments have different and/or additional modules than the ones shown in FIG. 9. Moreover, other embodiments distribute the functionalities among the modules in a different manner.

A document scoring module 910 scores documents to determine the magnitude and polarity of the sentiment they express. In one embodiment, the document scoring module 910 includes one or more classifiers. These classifiers include a lexicon-based classifier 912 and the domain-specific classifier 816 created by the analysis engine 810.

An embodiment of the lexicon-based classifier 912 uses the domain-independent sentiment lexicon 826 to calculate sentiment scores for documents in the domain-specific corpus 818. The scoring performed by the lexicon-based classifier 912 essentially looks for n-grams from the domain-independent lexicon 826 that occur in the documents of the corpus 818. For each n-gram that is found, the classifier 912 determines a score for that n-gram based on the techniques/factors described below. The sentiment score for the document is the sum of the scores of the n-grams occurring within it.

Embodiments of the lexicon-based classifier 912 use one or more of the following techniques/factors to determine the score for an n-gram found in a document:

the n-gram score in the lexicon: An n-gram in the lexicon 826 has an associated score representing the polarity and magnitude of the sentiment it expresses. For example, "hate" and "dislike" both have negative polarities, and "hate" has a greater magnitude than "dislike;"

part-of-speech tagging: The part of speech that an n-gram represents is classified and a score is assigned based on the classification. For example, the word "model" can be an adjective, noun or verb. When used as an adjective, "model" has a positive polarity (e.g., "he was a model student"). In contrast, when "model" is used as a noun or verb, the word is neutral with respect to sentiment.

negation detection: An n-gram that normally connotes one type of sentiment can be used in a negative manner. For example, the phrase "This meal was not good" inverts the normally-positive sentiment connoted by "good."

location in document: A score is influenced by where the n-gram occurs in the document. In one embodiment, n-grams are scored higher if they occur near the beginning or end of a document because these portions are more likely to contain summaries that concisely describe the sentiment described by the remainder of the document.

stemming: Reverse conjugation of a word in an n-gram is performed in order to identify its root word. A score is assigned to the word based on its root.

A document analysis module 914 analyzes documents scored by the document scoring module 910. In one embodiment, the document analysis module 914 analyzes the documents scored by the lexicon-based classifier 912 and isolates the highest-scoring documents. An embodiment of the module 914 uses two scoring thresholds to partition the documents into a set of documents that express very negative sentiment and a set of documents that express very positive sentiment. Thus, documents that have a sentiment score lower than the negative sentiment threshold are placed in the "very negative sentiment" set while documents that have a sentiment score higher than the positive sentiment threshold are placed in the "very positive sentiment" set. Documents falling in the middle range are ignored for purposes of this analysis.

A lexicon generation module 916 creates the domain-specific lexicon 822 based on the sets of high-sentiment documents isolated by the document analysis module 914. The lexicon generation module 916 identifies all n-grams up to a predetermined value of 'n' that occur in the documents in each set. "N" is five in one embodiment. Further, the lexicon generation module 916 identifies the most frequently occurring n-grams in each of the high-sentiment document sets (i.e., the most frequently occurring n-grams from the very negative sentiment document set and the most frequently occurring n-grams from the very positive sentiment document set).

A lexicon filtering module 918 filters the n-grams produced by the lexicon generation module 916 to produce a set of domain-specific sentiment-expressing n-grams. In one embodiment, the filtering module 918 removes extremely common n-grams (i.e., stop words) from the very negative and very positive sets. This filtering removes words and phrases like "the," "or," "he," and "she" that are unlikely to express sentiment. The n-grams that remain after filtering constitute the domain-specific sentiment lexicon 822.

A classifier building module 920 builds the domain-specific classifier 816 used by the document scoring module 910. In one embodiment, the classifier building module 920 assigns a score to each n-gram in the domain-specific sentiment lexicon 822 that represents the polarity and magnitude of the sentiment it expresses. The domain-specific classifier 816 uses the n-gram scores in the domain-specific sentiment lexicon 822, along with the techniques and factors described above with respect to the lexicon-based classifier 912, to classify the sentiment expressed by domain-specific documents.

To assign the scores to the n-grams in the domain-specific sentiment lexicon 822, the classifier building module 920 uses the n-grams as feature in a model, such as a maximum entropy model, and trains the model on documents. Other models used in some embodiments to assign sentiment scores to the n-grams are based on support vector machines, Naïve Bayes, perception, Winnow, and LASSO (Least Absolute Shrinkage and Selection Operator) instead of, or in addition to, maximum entropy.

In one embodiment, the classifier building module 920 trains the model on the labeled documents in the training corpus 824. Recall that in one embodiment the documents in the training corpus 824 include documents with manually-labeled sentiment scores. In other embodiments, the documents in the training corpus 824 include the set of high-sentiment documents having the scores assigned by the document scoring module 910 and isolated by the document analysis module 914 via the automated process described above. The set of high-sentiment documents can be used, for example, if obtaining the manually-labeled documents is too expensive or difficult, or if there are not enough manually-labeled documents available. Some embodiments train on both manually- and automatically-labeled documents. The training assigns accurate sentiment scores to the n-grams in the domain-specific lexicon 822.

A reporting module 922 reports results of operations performed by the analysis engine 810. The reports can include generating a presentation on the display of a computer, storing data in a log file describing the operations performed, storing data resulting from the operations performed by the analysis engine in the repository 812 or elsewhere, and the like. For example, the reporting module 922 can save the output of the lexicon filtering module 918 in the repository 812 as the domain-specific sentiment lexicon 822. Likewise, the reporting module 922 can store the sentiment scores for the n-grams in the filtered high-sentiment n-gram set generated by the classifier building module 920, and sentiment scores for documents generated by the domain-specific classifier 816, in the data repository 812 or elsewhere.

Figure 10:
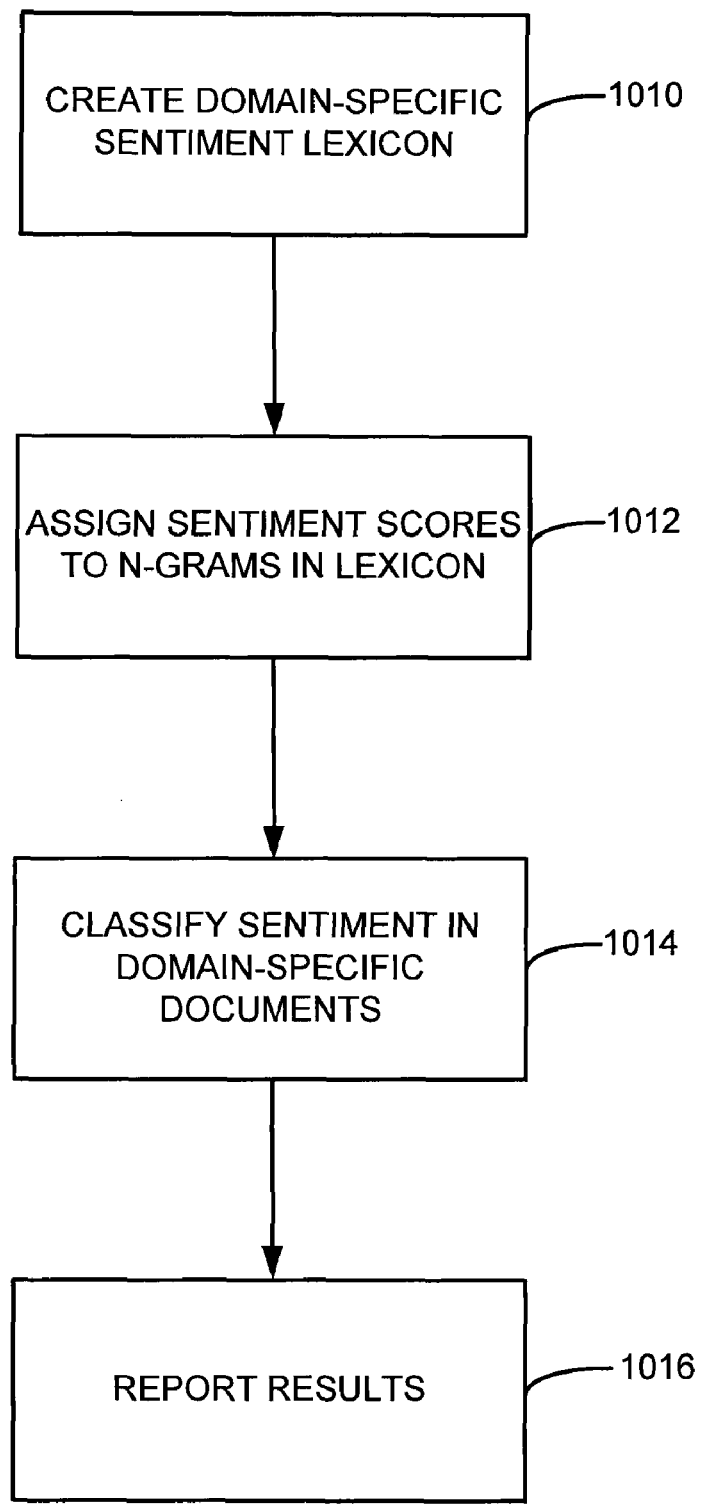
FIG. 10 is a flowchart illustrating steps performed by an embodiment.

FIG. 10 is a flowchart illustrating steps performed by the analysis engine 810 to build the domain-specific classifier 816 and apply the classifier to a set of domain-specific documents according to one embodiment. Other embodiments perform additional and/or different steps that the ones described in the figure. In addition, other embodiments perform the steps in different orders and/or perform multiple steps concurrently. Certain embodiments perform only some of the steps, such as only the steps directed to building the classifier 816.

The analysis engine 810 creates 1010 a domain-specific lexicon 822 and saves it in the data repository 812. The analysis engine 810 uses the training corpus 824 to associate 1012 sentiment scores with the n-grams in the lexicon 822. The n-grams and associated scores are used by the domain-specific classifier 816. In one embodiment, the analysis engine 810 uses the domain-specific classifier 816 to classify 1014 sentiment in domain-specific documents. The analysis engine 810 reports 1016 the results of the classifications. The report can be used to track the sentiment of an entity within the specific domain, to influence rankings of search results, and/or for other purposes.

Figure 11:
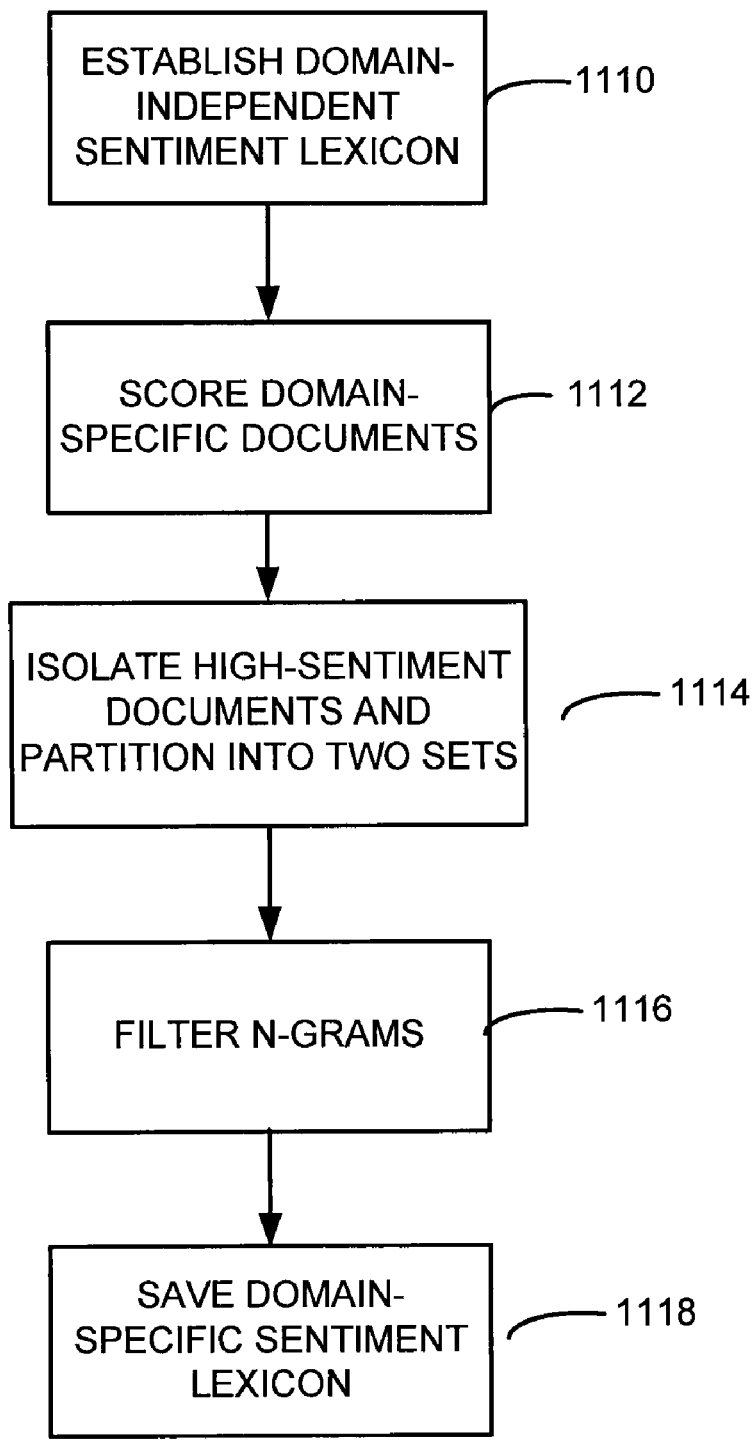
FIG. 11 is a flowchart illustrating steps performed by an embodiment.

FIG. 11 is a flowchart illustrating a more detailed view of steps performed by an embodiment of the analysis engine 810 in creating the domain-specific sentiment lexicon as illustrated in step 1010 of FIG. 10. Other embodiments perform additional and/or different steps that the ones described in the figure. In addition, other embodiments perform the steps in different orders and/or perform multiple steps concurrently.

The analysis engine 810 establishes 1110 a domain-independent sentiment lexicon 826. As described above, in one embodiment this lexicon 826 is created by manually selecting words having high sentiment from a lexical database and identifying antonyms and synonyms of the selected words. The selected words, antonyms, and synonyms are included in the domain-independent sentiment lexicon 826. Other embodiments use a pre-defined domain-independent sentiment lexicon or use other techniques to create the lexicon.

The analysis engine 810 uses the domain-independent sentiment lexicon 826 to score 1112 sentiment of documents in a domain-specific corpus 818. Then, the analysis engine 810 isolates the high-sentiment documents and partitions 1114 those documents into a set of very negative sentiment documents and a set of very positive sentiment documents. The analysis engine 810 extracts n-grams from the negative- and positive-sentiment documents. These n-grams are filtered 1116 to remove extremely common words and phrases. The remaining n-grams are saved 1118 as a domain-specific sentiment lexicon 822.

Figure 12:
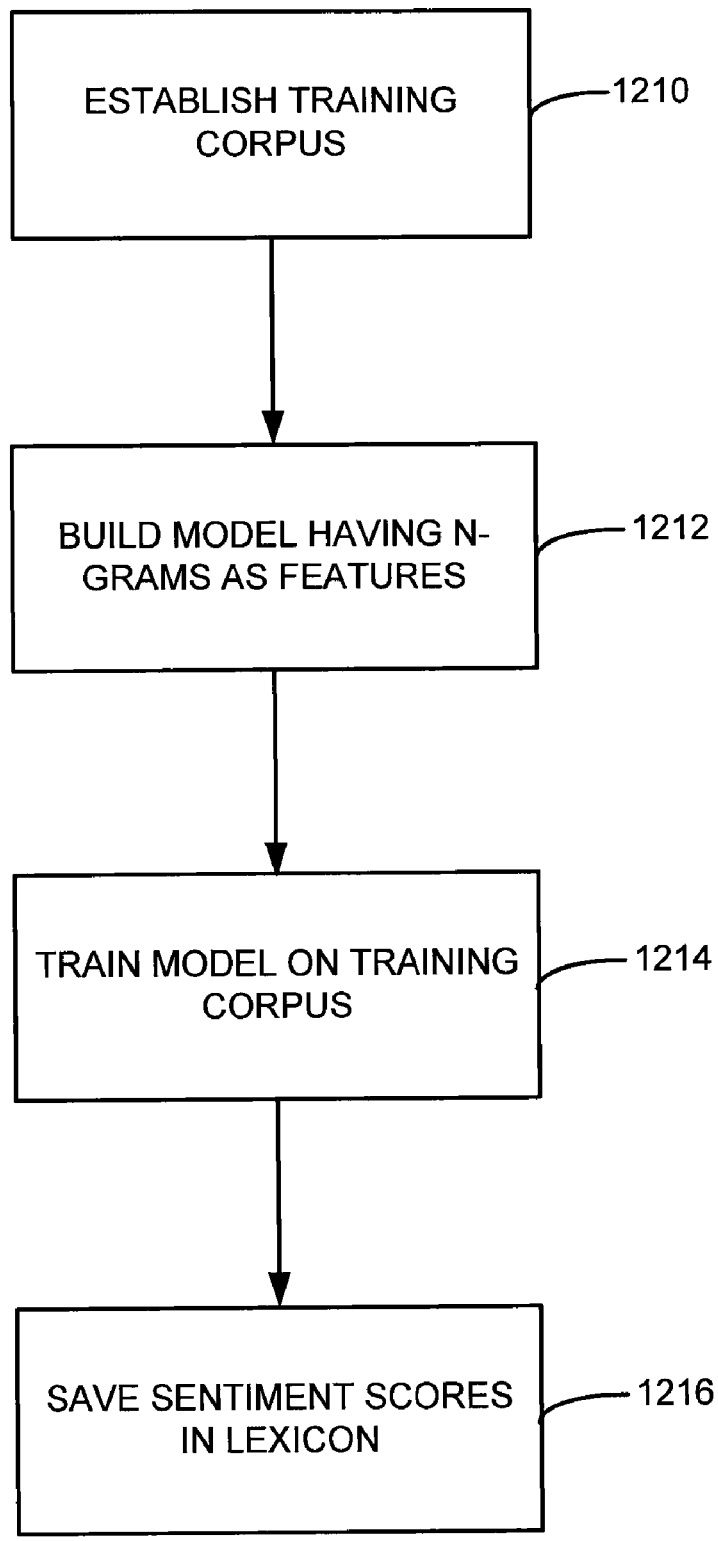
FIG. 12 is a flowchart illustrating steps performed by an embodiment.

FIG. 12 is a flowchart illustrating a more detailed view of steps performed by an embodiment of the analysis engine 810 in assigning sentiment scores to n-grams in the domain-specific sentiment lexicon 822 as illustrated in step 1012 of FIG. 10. Other embodiments perform additional and/or different steps that the ones described in the figure. In addition, other embodiments perform the steps in different orders and/or perform multiple steps concurrently.

The analysis engine 810 establishes 1210 a training corpus 824 of labeled documents. As described above, in some embodiments the training corpus 824 is established by collecting domain-specific documents that are manually labeled with sentiment scores while in other embodiments the training corpus 824 is established using the automatically-labeled set of high-sentiment documents isolated by the document analysis module 914. The analysis engine 810 builds 1212 a model, such as a maximum entropy model, having the n-grams of the domain-specific sentiment lexicon 822 as features. The model is trained 1214 on the labeled documents in the training corpus 824 to determine sentiment scores for the n-grams. These scores are saved 1216 in the domain-specific sentiment lexicon 822.

Those of skill in the art will recognize that the techniques described herein can be used to build multiple sentiment classifiers for documents in different domains. To this end, some embodiments have multiple domain-specific lexicons, domain-specific corpora, and training corpora. This description refers to a single domain-specific classifier 816 and domain for purposes of clarity.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method for generating a snippet for an entity, wherein the snippet comprises a plurality of sentiments about the entity, the method comprising:
    selecting a plurality of textual reviews associated with the entity;
    identifying, based on a domain-specific sentiment lexicon including sentiment phrases extracted from documents specific to a domain, a plurality of sentiment phrases from the plurality of textual reviews, wherein each identified sentiment phrase comprises a sentiment about the entity;
    determining a plurality of frequency values for the identified plurality of sentiment phrases, wherein each frequency value represents a number of times a sentiment phrase is identified in the one or more of textual reviews;
    selecting one or more sentiment phrases from the identified plurality of sentiment phrases based on the generated frequency values;
    generating the snippet including the selected one or more sentiment phrases; and
    storing the snippet.

2. The method of claim 1, further comprising displaying the snippet in association with a search result.

3. The method of claim 2, wherein the search result is displayed responsive to a search query comprising an entity type associated with the entity.

4. The method of claim 1, wherein identifying a plurality of sentiment phrases comprises identifying a noun phrase corresponding to a property of the entity and an adjective associated with the noun phrase.

5. The method of claim 4, wherein identifying a noun phrase corresponding to a property of the entity and an adjective associated with the noun phrase comprises identifying a match between a regular expression and a textual review.

6. The method of claim 4, further comprising:
    generating a sentiment score for each of the plurality of sentiment phrases, wherein each sentiment score is based at least in part on the adjective associated with the noun phrase.

7. The method of claim 4, wherein selecting one or more sentiment phrases comprises:
    determining at least a first group of sentiment scores based on the noun phrase; and
    selecting a representative sentiment phrase based on the plurality of frequency values.

8. The method of claim 1, further comprising:
    generating a sentiment score for each of the plurality of sentiment phrases; and
    selecting one or more sentiment phrases from the plurality of sentiment phrases based at least in part on the sentiment scores.

9. The method of claim 1, wherein the sentiment phrases are comprised of a plurality of tokens and selecting one or more sentiment phrases comprises:

generating a redundancy metric, wherein each redundancy metric is based on a number of tokens shared between two sentiment phrases; and selecting one or more sentiment phrases based on the redundancy metric.

10. The method of claim 1, further comprising:

associating a sentiment score with each of the identified plurality of sentiment phrases;

wherein the selection of the one or more sentiment phrases from the identified plurality of sentiment phrases is based on the corresponding sentiment scores.

11. The method of claim 1, further comprising developing the domain-specific sentiment lexicon based on a domain-independent lexicon, the domain-independent sentiment lexicon including sentiment phrases extracted from domain independent documents.

12. The method of claim 11, wherein developing the domain-specific sentiment lexicon comprises:

determining sentiment scores for each of the documents that are specific to the domain;

selecting a subset of the domain-specific documents based on their sentiment scores;

selecting sentiment phrases from the subset of domain-specific documents; and including in the domain-specific sentiment lexicon at least some of the sentiment phrases selected from the subset.

13. The method of claim 1, wherein the domain comprises a particular sphere of activity and the entity is of a type within the domain.

14. A computer readable storage medium comprising computer program code for generating a snippet for an entity, wherein the snippet comprises a plurality of sentiments about the entity, the computer program code comprising program code for:

selecting a plurality of textual reviews associated with the entity;

identifying, based on a domain-specific sentiment lexicon including sentiment phrases extracted from documents specific to a domain, a plurality of sentiment phrases from the plurality of textual reviews, wherein each identified sentiment phrase comprises a sentiment about the entity;

determining a plurality of frequency values for the identified plurality of sentiment phrases, wherein each frequency value represents a number of times a sentiment phrase is identified in the one or more of textual reviews;

selecting one or more sentiment phrases from the identified plurality of sentiment phrases based on the generated frequency values;

generating the snippet including the selected one or more sentiment phrases; and storing the snippet.

15. The medium of claim 14, further comprising displaying the snippet in association with a search result.

16. The medium of claim 15, wherein the search result is displayed responsive to a search query comprising an entity type associated with the entity.

17. The medium of claim 14, wherein identifying a plurality of sentiment phrases comprises identifying a noun phrase corresponding to a property of the entity and an adjective associated with the noun phrase.

18. The medium of claim 17, wherein identifying a noun phrase corresponding to a property of the entity and an adjective associated with the noun phrase comprises identifying a match between a regular expression and a textual review.

19. The medium of claim 17, further comprising program code for:

generating a sentiment score for each of the plurality of sentiment phrases, wherein each sentiment score is based at least in part on the adjective associated with the noun phrase.

20. The medium of claim 17, wherein selecting one or more sentiment phrases comprises:

determining at least a first group of sentiment scores based on the noun phrase; and selecting a representative sentiment phrase based on the plurality of frequency values.

21. The medium of claim 14, further comprising program code for:

generating a sentiment score for each of the plurality of sentiment phrases; and selecting one or more sentiment phrases from the plurality of sentiment phrases based at least in part on the sentiment scores.

22. The medium of claim 14, wherein the sentiment phrases are comprised of a plurality of tokens and selecting one or more sentiment phrases comprises:

generating a redundancy metric, wherein each redundancy metric is based on a number of tokens shared between two sentiment phrases; and selecting one or more sentiment phrases based on the redundancy metric.

23. A computer system for generating a snippet for an entity, wherein the snippet comprises a plurality of sentiments about the entity, the system comprising:

a database comprising a plurality of textual reviews associated with the entity;

a phrase extraction module adapted to identify, based on a domain-specific sentiment lexicon including sentiment phrases extracted from documents specific to a domain, a plurality of sentiment phrases from the plurality of textual reviews, wherein each identified sentiment phrase comprises a sentiment about the entity; and determine a plurality of frequency values for the identified plurality of sentiment phrases, wherein each frequency value represents a number of times a sentiment phrase is identified in the one or more of textual reviews; and a snippet generation module adapted to:

select one or more sentiment phrases from the identified plurality of sentiment phrases based on the generated frequency values;

generate the snippet including the selected one or more sentiment phrases; and store the snippet.

24. The system of claim 23, wherein the phrase extraction module is further adapted to identify a noun phrase corresponding to a property of the entity and an adjective associated with the noun phrase.

25. The system of claim 24, further comprising a sentiment score module adapted to:

generate a sentiment score for each of the plurality of sentiment phrases, wherein each sentiment score is based at least in part on the adjective associated with the noun phrase.

26. The system of claim 23, further comprising a sentiment score module adapted to generate a sentiment score for each of the plurality of sentiment phrases and wherein the phrase extraction module is adapted to select one or more sentiment phrases from the plurality of sentiment phrases based at least in part on the sentiment scores.

* * * * *